United States Patent
Gauché et al.

(10) Patent No.: US 12,036,536 B2
(45) Date of Patent: Jul. 16, 2024

(54) PROCESS FOR PREPARING A COBALT-CONTAINING CATALYST PRECURSOR AND PROCESS FOR HYDROCARBON SYNTHESIS

(71) Applicant: Sasol South Africa Limited, Sandton (ZA)

(72) Inventors: Jean Louis Gauché, Potchefstroom (ZA); Cornelia Pienaar, Vanderbijlpark (ZA); Jurie Christiaan Wessels Swart, Johannesburg (ZA); Jan Mattheus Botha, Sasolburg (ZA); Denzil James Moodley, Vanderbijlpark (ZA); Jana Heloise Potgieter, Sasolburg (ZA); Jolandie Zonja Davel, Sasolburg (ZA)

(73) Assignee: Sasol South Africa Limited, Sandton (ZA)

( * ) Notice: Subject to any disclaimer, the term of this patent is extended or adjusted under 35 U.S.C. 154(b) by 563 days.

(21) Appl. No.: 17/312,376

(22) PCT Filed: Oct. 23, 2019

(86) PCT No.: PCT/IB2019/059063
§ 371 (c)(1),
(2) Date: Jun. 9, 2021

(87) PCT Pub. No.: WO2020/121076
PCT Pub. Date: Jun. 18, 2020

(65) Prior Publication Data
US 2022/0016605 A1 Jan. 20, 2022

(30) Foreign Application Priority Data
Dec. 10, 2018 (ZA) ................................ 2018/08304

(51) Int. Cl.
*B01J 23/89* (2006.01)
*B01J 8/24* (2006.01)
(Continued)

(52) U.S. Cl.
CPC ............. *B01J 23/8986* (2013.01); *B01J 8/24* (2013.01); *B01J 21/08* (2013.01); *B01J 23/002* (2013.01);
(Continued)

(58) Field of Classification Search
CPC . B01J 23/8986; B01J 8/24; B01J 21/08; B01J 35/647; B01J 37/0203; B01J 23/75;
(Continued)

(56) References Cited

U.S. PATENT DOCUMENTS

2018/0280939 A1 10/2018 Maury et al.

FOREIGN PATENT DOCUMENTS

| EP | 2276563 | 5/2018 |
| WO | WO 2012/153217 | 11/2012 |
| WO | WO 2018/029548 | 2/2018 |

OTHER PUBLICATIONS

PCT International Search Report and Written Opinion issued in International Application No. PCT/IB2019/059063, mailed Jan. 27, 2020.
(Continued)

*Primary Examiner* — Jafar F Parsa
(74) *Attorney, Agent, or Firm* — Parker Highlander PLLC

(57) ABSTRACT

The invention provides a process for preparing a cobalt-containing catalyst precursor. The process includes calcining a loaded catalyst support comprising a silica ($SiO_2$) catalyst support supporting cobalt nitrate to convert the cobalt nitrate into cobalt oxide. The calcination includes heating the loaded catalyst support at a high heating rate, which does not fall below 10° C./minute, during at least a temperature range
(Continued)

A. The temperature range A is from the lowest temperature at which calcination of the loaded catalyst support begins to 165° C. Gas flow is effected over the loaded catalyst support during at least the temperature range A. The catalyst precursor is reduced to obtain a Fischer-Tropsch catalyst.

14 Claims, 4 Drawing Sheets

(51) Int. Cl.
| | |
|---|---|
| *B01J 21/08* | (2006.01) |
| *B01J 23/00* | (2006.01) |
| *B01J 35/64* | (2024.01) |
| *B01J 37/04* | (2006.01) |
| *B01J 37/08* | (2006.01) |
| *B01J 37/18* | (2006.01) |
| *C10G 2/00* | (2006.01) |

(52) U.S. Cl.
CPC ........... *B01J 35/643* (2024.01); *B01J 35/647* (2024.01); *B01J 37/04* (2013.01); *B01J 37/082* (2013.01); *B01J 37/18* (2013.01); *C10G 2/332* (2013.01); *C10G 2300/4006* (2013.01); *C10G 2300/4018* (2013.01); *C10G 2300/70* (2013.01)

(58) Field of Classification Search
CPC .. B01J 37/088; C10G 2/32; C10G 2300/4018; C10G 2300/70
See application file for complete search history.

(56) References Cited

OTHER PUBLICATIONS

Van de Loosdrecht et al., "Calcination of co-based Fischer-Tropsch synthesis catalysts," *Topics in Catalysis*, 26(1-4):121-127, 2003.
PCT Chapter II Demand and Formal Written Reply submitted in International Application No. PCT/IB2019/059063, dated Mar. 18, 2020.
PCT International Preliminary Report on Patentability issued in International Application No. PCT/IB2019/059063, completed Mar. 15, 2021.

△ ○ calcined to 150 °C; ◮◐ calcined to 175 °C; ▲ ● calcined to 250 °C

△ ○ calcined to 130 °C; ◮◐ calcined to 175 °C; ▲ ● calcined to 250 °C

PROCESS FOR PREPARING A COBALT-CONTAINING CATALYST PRECURSOR AND PROCESS FOR HYDROCARBON SYNTHESIS

The present application is a national phase application under 35 U.S.C. § 371 of International Application No. PCT/IB2019/059063, filed Oct. 23, 2019, which claims the priority benefit of South African Application No. 2018/08304, filed Dec. 10, 2018, the entire contents of each of which are hereby incorporated by reference.

TECHNICAL FIELD

This invention relates to catalysts. In particular, it relates to a process for preparing a cobalt-containing catalyst precursor including a hydrocarbon synthesis catalyst precursor, to a process for preparing a catalyst including a hydrocarbon synthesis catalyst, and to a process for producing hydrocarbons which includes using the said catalyst.

BACKGROUND ART

It is known that supported cobalt-containing Fischer-Tropsch synthesis (FTS) catalysts are prepared by means of impregnation of a cobalt salt such as cobalt nitrate onto and/or into a catalyst support such as a silica support, followed by calcination of the resultant impregnated, i.e. loaded, catalyst support to obtain a FTS catalyst precursor. The catalyst precursor is then reduced to obtain the FTS catalyst comprising cobalt crystallites dispersed on the support.

Calcination conditions used during the preparation of silica supported catalysts are known in the art and are for example described in WO 2016/135577 and WO2018/029548. The calcination conditions used in these documents include heating at a rate of 1° C./min to 250° C. Surprisingly it has now been found that if a loaded catalyst support is calcined at a much higher heating rate which is maintained during a certain temperature range, according to the present invention, an improved catalyst is obtained.

WO 2012/153217 discloses calcination at higher heating rates (also disclosed in comparative examples of WO 2012/153218) and that it is essential that lower heating rate periods be included in the temperature range disclosed by the present invention as one during which only a high heating rate is used. In the present invention it was surprisingly found, however, that no low heating rate periods are desired during this temperature range. Unexpectedly it was found, in the present invention, that if the high heating rate is not maintained during this temperature range (that is if low heating rate periods are included in the said range, as required by the prior art) then the activity (for example) of the catalyst is negatively influenced.

Surprisingly, it was also found that for loaded catalyst supports of the present invention the absence of low heating rate periods in this range does not result in increased catalyst break-up.

DISCLOSURE OF THE INVENTION

Cobalt-Containing Catalyst Precursor

According to a first aspect of the present invention, there is provided a process for preparing a cobalt-containing catalyst precursor, which process includes calcining a loaded catalyst support comprising a silica ($SiO_2$) catalyst support supporting cobalt nitrate, the calcination of the loaded catalyst support comprising converting the cobalt nitrate into cobalt oxide; and the calcination including heating the loaded catalyst support at a high heating rate which does not fall below 10° C./minute during at least a temperature range A which is from the lowest temperature at which the calcination of the loaded catalyst support begins to 165° C. and wherein gas flow is effected over the loaded catalyst support during at least the temperature range A, thereby to produce the cobalt-containing catalyst precursor.

The catalyst precursor may be a hydrocarbon synthesis catalyst precursor for synthesising hydrocarbons and/or oxygenates of hydrocarbons from at least hydrogen and carbon monoxide. Preferably, the catalyst precursor is a Fischer-Tropsch (FT) synthesis catalyst precursor for performing Fischer-Tropsch synthesis. The FT synthesis may be performed in a fixed bed reactor, a slurry bed reactor or a fixed fluidized bed reactor. Preferably, the FT synthesis is a three-phase slurry bed FT synthesis process.

The Loaded Catalyst Support

The silica ($SiO_2$) catalyst support may be a precipitated silica support. Preferably it is a fumed (it may also be referred to as a pyrogenic) silica support or a silica gel support. Preferably it is an amorphous silica support especially an amorphous fumed silica support or an amorphous silica gel support The silica ($SiO_2$) catalyst support may be porous and may have an average pore diameter of at least 10 nm to 20 nm, preferably of more than 20 nm but less than 50 nm. Preferably the silica support has an average pore diameter of more than 22 nm, preferably at least 25 nm, preferably less than 40 nm, preferably from 25 to 35 nm, preferably 30 nm. The average pore diameter was determined by means of Barrett-Joyner-Halenda (BJH) nitrogen physisorption analysis. It will be appreciated that the average pore diameter is the average pore diameter of the support as such, that is prior to the addition of the cobalt nitrate or any of the other compounds described below to the silica catalyst support.

The support pore volume may be between 0.1 and 1 ml/g catalyst support, preferably between 0.3 and 0.9 ml/g catalyst support.

The silica catalyst support may be pre-shaped. The pre-shaped support may be a particulate support, preferably with an average particle size of between 1 and 500 micrometers, preferably between 10 and 250 micrometers, still more particularly from 45 to 200 micrometers.

The cobalt nitrate may be $Co(NO_3)_2 \cdot 6H_2O$.

The loaded catalyst support may also include a cobalt salt other than cobalt nitrate. Preferably the loaded catalyst support includes cobalt hydroxide ($Co(OH)_2$) in addition to the cobalt nitrate. The weight ratio of the $Co(OH)_2$ to cobalt nitrate may be 0.02 to 0.1, preferably about 0.028 to 0.067. Preferably the $Co(OH)_2$ is introduced onto and/or into the support in a liquid medium and the amount of $Co(OH)_2$ added is such that the pH is between 4.5 and 5.5, preferably about 5.

The cobalt nitrate may be introduced (preferably impregnated) onto and/or into the support in more than one introduction (preferably impregnation) step. Preferably the loaded catalyst support is calcined after each introduction (preferably impregnation) step. It will be appreciated that in such cases, after a first introduction (preferably impregnation) step and subsequent calcination, a following introduction (preferably impregnation) step will result in the loaded catalyst support then including both cobalt oxide and cobalt nitrate. It will be appreciated that the loaded catalyst support may in some embodiments of the invention include cobalt oxide and cobalt nitrate.

The Co(OH)$_2$ may be introduced with the cobalt nitrate during the first introduction (preferably impregnation) step, and preferably subsequent cobalt nitrate introduction (preferably impregnation) steps would typically not include the addition of Co(OH)$_2$.

The catalyst precursor may contain cobalt (Co) at a loading of from 5 to 70 g Co/100 g catalyst support, preferably from 20 to 40 g Co/100 g catalyst support, and more preferably from 25 to 35 g Co/100 g catalyst support.

Preferably the loaded catalyst support includes a titanium (Ti) compound on and/or in the catalyst support. Preferably the loaded catalyst support includes a manganese (Mn) compound on and/or in the catalyst support. Preferably the loaded catalyst support includes both a titanium compound on and/or in the catalyst support and a manganese compound on and/or in the catalyst support.

Preferably, the loaded catalyst support includes more than 1 wt % and not more than 10 wt % Ti, based on the weight of the silica (SiO$_2$) catalyst support, the Ti being present in the form of one or more titanium compounds.

Preferably, the loaded catalyst support does not include more than 5 wt % Ti, preferably not more than 3.5 wt % Ti. Preferably, titanium, in the form of the one or more titanium compounds, may be present in and/or on the catalyst support in an amount of more than 1.5 wt %, preferably at least 2.0 wt %, more preferably at least 2.4 wt % Ti.

Preferably, titanium, in the form of the one or more titanium compounds, may be present in and/or on the catalyst support in an amount of less than 3.5 wt %, preferably not more than 3.0 wt %, but preferably more than 2.0 wt % Ti.

The preferred amount of titanium, in the form of the one or more titanium compounds, present in and/or on the catalyst support is 2.6 wt % Ti. The Ti is preferably present as titanium oxide.

Preferably, the Ti is included as a support modifier, that is as Ti which has been introduced onto and/or into the catalyst support (and preferably also calcined) prior to a cobalt nitrate having been introduced onto and/or into the catalyst support. Preferably, the titanium compound is titanium oxide.

Alternatively, the Ti may be included as a promoter, that is, as Ti which has been introduced onto and/or into the catalyst support during and/or subsequent to a cobalt nitrate having been introduced onto and/or into the catalyst support. The titanium compound may comprise a titanium salt. The titanium salt may be calcined with the cobalt nitrate to convert the titanium salt to titanium oxide.

Preferably, the loaded catalyst support includes more than 0.5 wt % and less than 10 wt % Mn, based on the weight of the silica (SiO$_2$) catalyst support, the Mn being present in the form of one or more manganese compounds.

Preferably, the loaded catalyst support does not include more than 7.5 wt % Mn, preferably not more than 5 wt % Mn. Preferably, manganese, in the form of the one or more manganese compounds, may be present in and/or on the catalyst support in an amount of more than 1 wt %, preferably at least 1.5 wt %, more preferably at least 1.6 wt % Mn.

Preferably, manganese, in the form of the one or more manganese compounds, may be present in and/or on the catalyst support in an amount of less than 3.2 wt %, preferably not more than 2.3 wt %, but preferably more than 1.5 wt % Mn.

The preferred amount of manganese, in the form of the one or more manganese compounds, present in and/or on the catalyst support is 2.2 wt % Mn. Alternatively it may be 1.6 wt % Mn.

Preferably, the manganese compound is an inorganic manganese compound, such as manganese nitrate. Alternatively, it may be an organic manganese compound. In this specification, an organic manganese compound is a manganese compound wherein manganese is associated with at least one organic group by means of a bond, for instance by means of a covalent bond, a metal-to-ligand coordination or an ionic interaction.

Preferably the Mn may be included as a promoter, that is, as Mn which has been introduced onto and/or into the catalyst support during and/or subsequent to a cobalt compound having been introduced onto and/or into the catalyst support. The manganese compound may be present as a manganese salt, preferably manganese nitrate. Preferably the manganese salt is calcined with the cobalt nitrate in order to convert the manganese salt to manganese oxide.

Alternatively, the Mn may be included as a support modifier, that is, as Mn which has been introduced onto and/or into the catalyst support (and preferably also calcined) prior to a cobalt compound having been introduced onto and/or into the catalyst support. The manganese may be present as manganese oxide.

In a preferred embodiment of the invention the loaded catalyst support which is calcined comprises a silica catalyst support supporting cobalt nitrate and cobalt hydroxide. The silica support preferably includes a titanium compound, preferably titanium oxide; and the silica support also includes a manganese compound, preferably a manganese salt, preferably manganese nitrate. During calcination the cobalt nitrate and cobalt hydroxide may react with oxygen to be converted to cobalt oxide; and the manganese compound may be converted to manganese oxide. Preferably the titanium compound is titanium oxide, however if it is not titanium oxide it is converted to titanium oxide during calcination.

The loaded catalyst support may be prepared as set out in WO2016/135577 and WO2018/029548 which are incorporated herein by reference.

In one embodiment of the invention, the catalyst composition includes no or substantially no Re. Preferably, if any Re is present in the catalyst composition, the Re to Co weight ratio is below 0.001:1.

The loaded catalyst support may also include a dopant, preferably a dopant capable of enhancing the reducibility of a cobalt nitrate after calcination thereof. The dopant may be in the form of a dopant compound which is a compound of a metal selected from the group including palladium (Pd), platinum (Pt), ruthenium (Ru), rhenium (Re) and a mixture of two or more thereof. The mass proportion of the metal of the dopant (especially palladium metal or platinum metal) to the cobalt metal may be from 1:300 to 1:3000.

The loaded catalyst support may also include an acid, preferably an organic acid, preferably maleic acid.

Calcination

During the calcination of the loaded catalyst support the cobalt nitrate is converted into a cobalt oxide, preferably, a cobalt oxide selected from CoO, CoO(OH), Co$_3$O$_4$, Co$_2$O$_3$ or a mixture of one or more thereof. Preferably the cobalt oxide is Co$_3$O$_4$.

The high heating rate during the temperature range A does not fall below 10° C./min, preferably the high heating rate does not fall below 15° C./min during the temperature range A, and preferably the high heating rate does not fall below 20° C./min during the temperature range A. Preferably the high heating rate does not fall below 48° C./min during the temperature range A, preferably the high heating rate does not fall below 55° C./min during the temperature range A and preferably the high heating rate does not fall below 66° C./min during the temperature range A. The high heating rate may not fall below 144° C./min during the temperature range A, and it may even not fall below 221° C./min during the temperature range A. Preferably the high heating rate during the temperature range A is not above 300° C./min, preferably not above 233° C./min and preferably not above 221° C./min.

In a preferred embodiment of the invention the calcination includes heating the loaded catalyst support to a temperature above the temperature range A, preferably to a temperature of at least 170° C., preferably to at least 180° C., preferably to at least 200° C., preferably to at least 220° C., preferably to at least 250° C., and preferably not above 400° C.

Preferably the calcination also includes heating the loaded catalyst support to a temperature above the temperature range A, at the high heating rate described above, preferably to a temperature of at least 170° C., preferably at least 180° C., preferably at least 200° C., preferably at least 220° C., preferably to at least 250° C. and preferably not above 350° C. preferably not above 300° C.

If the calcination at the high heating rate terminates at a temperature below 250° C., then the calcination may proceed to at least 250° C. at a heating rate below that of the high heating rate.

Preferably the high heating rate during the temperature range A is the same as the high heating rate above the temperature range A.

Preferably the calcination includes heating the loaded catalyst support at a high heating rate which does not fall below 10° C./minute during at least a temperature range which is from 100° C. to 170° C., preferably from 100° C. to 180° C., preferably from 100° C. to 200° C., preferably from 100° C. to 220° C., preferably from 100° C. to 250° C. Preferably these temperature ranges start at 90° C., preferably at 85° C. instead of 100° C. The high heating rate may be at the higher high heating rates as described above.

The lowest temperature at which the calcination of the loaded catalyst support begins is the lowest temperature at which the cobalt nitrate begins to be converted to cobalt oxide. This temperature is the temperature at which cobalt nitrate begins to decompose to release $NO_2$ gas (the evolution point of the $NO_2$) in excess of 1500 ppm(v) or 0.15 vol-%. The temperature at which release of $NO_2$ gas in excess of 1500 ppm(v) begins is measured by means of FTIRS with gas phase analysis at a heating rate of 0.5° C./min in a He gas mixture containing 12% $O_2$ gas flow rate of (0.5 ml/s).

The temperature at which release of $NO_2$ gas in excess of 1500 ppm(v) starts may depend on the composition of the loaded catalyst support. It is known that the presence of $Co(OH)_2$ and/or maleic acid influences this temperature. In one embodiment of the invention the temperature at which release of $NO_2$ gas in excess of 1500 ppm(v) starts is 125° C., alternatively it is 115° C. alternatively it is 100° C.

In a preferred embodiment of the invention heating of the loaded catalyst support at the high heating rate may start at 120° C., preferably at 110° C., preferably at 100° C., preferably at 90° C., or even at 85° C., and this may be carried out to 165° C., that is to the temperature at which the temperature range A ends. It will be appreciated that the high heating rate may start at a temperature below the lowest temperature at which the calcination of the loaded catalyst support begins.

The calcination may comprise reacting the cobalt nitrate with a source of oxygen thereby converting the cobalt nitrate into cobalt oxide. The source of oxygen may be any suitable source and preferably it is an oxygen containing gas. The oxygen containing gas may be oxygen, and preferably the oxygen containing gas is air.

The gas flow that is effected over the loaded catalyst support during the temperature range A may be at a gas hourly space velocity (GHSV) of at least 5 $Nm^3$/kg cobalt nitrate/hour; preferably it is at least 9 $Nm^3$ per/kg cobalt nitrate/hour, or even at least 14 $Nm^3$/kg cobalt nitrate/hour. In cases where the loaded catalyst support is fed continuously or in multiple batches, the amount of cobalt nitrate is the amount of cobalt nitrate fed in an hour. That is, if the gas flow is 20 $Nm^3$ per hour and 2 kg cobalt nitrate is fed in an hour, then the gas flow of 20 $Nm^3$ per hour is divided by 2 kg cobalt nitrate to provide a GHSV is 10 $Nm^3$ per/kg cobalt nitrate/hour.

The gas used during the calcination may be any suitable gas such as an inert gas or an oxygen containing gas. The inert gas may be nitrogen. The oxygen containing gas may be oxygen, and preferably the oxygen containing gas is air.

Preferably, where the calcination includes heating of the loaded catalyst support below and/or above the temperature range A, the calcination also includes gas flow over the loaded catalyst support during that heating. The gas flow during that heating may be at the same GHSV than that carried out during the heating of the temperature range A.

The calcination may be carried out in any suitable calcination apparatus (calciner). Such calcination apparatus may include a fluidised bed calciner. It will be appreciated that the heating rate refers to the rate at which the loaded catalyst support introduced into the calcination apparatus (described below) is heated to reach the reactor temperature. That is the heating rate is the difference between the reactor temperature (end temperature) and the temperature of the loaded catalyst support as it is introduced into the reactor (start temperature) divided by the time it takes for the loaded catalyst support to reach the end temperature from the start temperature.

The loaded catalyst support may be introduced into the calcination apparatus (calciner) in any suitable manner. Preferably the loaded catalyst support may be fed in a continuous manner. Alternatively, it may be fed in batches, preferably multiple batches.

The loaded catalyst support is fed to the calciner in order that the heating rate during the temperature range A does not fall below the high heating rate.

The loaded catalyst support may be unloaded in one or more batches from the calciner. Multiple batches fed to the calciner may be unloaded as a single batch The loaded catalyst support may be calcined in order that the nitrogen content of the calcined loaded catalyst support may be not more than 0.4 wt %, preferably not more than 0.3 wt %, as determined by CHNS elemental analysis.

The process may also include drying the loaded catalyst support prior to calcining the loaded catalyst support at the high heating rate during the temperature range A. Preferably the drying does not take place at above 100° C. The drying may be carried out at a pressure less than atmospheric pressure. Preferably, at least 2 of the 6 crystal waters, that is 33.3% crystal waters, should be removed from the impregnated $Co(NO_3)_2 \cdot 6H_2O$ during the drying process. Preferably not more than 50% (3 of the 6 $Co(NO_3)_2 \cdot 6H_2O$) crystal waters should be removed during the drying process. It will be appreciated that if the drying percentage of the crystal waters is between 33.3% and 50%, then the first two crystal waters and some of the third crystal waters have been removed.

The percentage of crystal waters removed may be calculated from the mass change measured during loss on ignition (LOI) at 400° C.

Activation

According to a second aspect of the present invention, there is provided a process for preparing a cobalt-containing catalyst, the process comprising preparing a cobalt-containing catalyst precursor as set out above; and reducing the catalyst precursor, thereby activating the catalyst precursor.

Thus, an active cobalt-containing catalyst, comprising a catalyst support supporting cobalt may be obtained.

Reducing the catalyst precursor may comprise converting the cobalt oxide to cobalt with a zero valency.

The reduction of the catalyst precursor preferably includes treating it with a reducing gas to activate it. Preferably, the reducing gas is hydrogen or a hydrogen containing gas. The hydrogen containing gas may consist of hydrogen and one or more inert gases which are inert in respect to the active catalyst. The hydrogen containing gas preferably contains at least 90 volume % hydrogen.

The reducing gas may be contacted with the catalyst precursor in any suitable manner. Preferably the catalyst precursor is provided in the form of a bed of particles with the reducing gas being caused to flow through the bed of particles. The bed of particles may be a fixed bed, but preferably it is a fluidised bed and preferably the reducing gas acts as the fluidising medium for the bed of catalyst precursor particles.

The reduction may be carried out at a pressure from 0.6 to 1.5 bar(a), preferably from 0.8 to 1.3 bar(a). Alternatively, the pressure may be from 1.5 bar(a) to 20 bar(a). Preferably, however, the pressure is at about atmospheric pressure.

The reduction is preferably carried out at a temperature above 25° C. at which the catalyst precursor will be reduced to an active form. Preferably, the reduction is carried out at a temperature above 150° C., and preferably below 600° C. Preferably the reduction is carried out at a temperature below 500° C., more preferably below 450° C.

During reduction the temperature may be varied, and preferably it is increased to a maximum temperature at which reduction is carried out, as set out above.

The flow of the reducing gas through the bed of particles is preferably controlled to ensure that contaminants produced during reduction are maintained at a sufficiently low level. The reducing gas may be recycled, and preferably the recycled reducing gas is treated to remove one or more contaminants produced during reduction. The contaminants may comprise one or more of water and ammonia.

The reduction may be carried out in two or more steps during which one or both of the heating rate and the space velocity of the reducing gas is varied.

In one embodiment of the invention, the active catalyst may be coated preferably by introducing a mixture of active catalyst particles and a coating medium in the form of a molten organic substance, which is at a temperature $T_1$, and which sets or congeals at a lower temperature $T_2$ so that $T_2 < T_1$, into at least one mould; and at least partly submerging the mould in a cooling liquid, so as to cool the organic substance down to a temperature $T_3$, where $T_3 \leq T_2$.

During the reduction, the water partial pressure is preferably kept as low as possible, more preferably below 0.1 atmosphere. The hydrogen space velocity may be from 2 to 4 liters per hour per gram of catalyst.

In one embodiment of the present invention, the process for preparing the cobalt-containing catalyst may include in a carbide formation step, treating the activated catalyst, comprising the catalyst support supporting cobalt with a zero valency, with a CO containing gas (preferably at a temperature Ti, where $T_1$ is from 200° C. to 280° C.) to convert the cobalt to cobalt carbide thereby obtaining a cobalt carbide containing catalyst precursor; and in a subsequent activation step, subjecting the cobalt carbide containing catalyst precursor to treatment with a hydrogen containing gas (preferably at a temperature $T_2$, where $T_2$ is at least 300° C.) to convert the cobalt carbide to cobalt metal thereby activating the cobalt carbide containing catalyst precursor and obtaining a cobalt-containing hydrocarbon synthesis catalyst.

The catalyst may be a hydrocarbon synthesis catalyst for synthesising hydrocarbons and/or oxygenates of hydrocarbons from at least hydrogen and carbon monoxide. Preferably, the catalyst is a Fischer-Tropsch (FT) synthesis catalyst for performing Fischer-Tropsch synthesis. The FT synthesis may be performed in a fixed bed reactor, a slurry bed reactor or a fixed fluidized bed reactor. Preferably, the FT synthesis is a three-phase slurry bed FT synthesis process.

Hydrocarbon Synthesis

According to a third aspect of the present invention, there is provided a hydrocarbon synthesis process for producing hydrocarbons and, optionally, oxygenates of hydrocarbons, which process includes contacting a cobalt-containing catalyst as set out above with hydrogen and carbon monoxide at a temperature above 100° C. and at a pressure of at least 10 bar to produce hydrocarbons and optionally, oxygenates of hydrocarbons.

According to a fourth aspect of the present invention, there is provided a hydrocarbon synthesis process for producing hydrocarbons and, optionally, oxygenates of hydrocarbons, which process includes contacting a synthesis gas comprising hydrogen, carbon monoxide and N-containing contaminants selected from the group consisting of HCN, $NH_3$, NO, $R_xN H_{3-x}$ where R is an organic group and x is 1, 2 or 3, with R being the same or different when x is 2 or 3, $R^1$—CN where $R^1$ is an organic group, and heterocyclic compounds containing at least one nitrogen atom as a ring member of a heterocyclic ring of the heterocyclic compound, with the N-containing contaminants constituting, in total, at least 100 vppb but less than 1000000 vppb of the synthesis gas, at a temperature of at least 180° C. and a pressure of at least 10 bar(a) (1000 kPa(a)), with a catalyst as set out above to obtain hydrocarbons and, optionally, oxygenates of hydrocarbons, by means of Fischer-Tropsch synthesis reaction of the hydrogen with the carbon monoxide.

The synthesis gas (syngas) may contain, in total, at least 200 vppb N-containing contaminants. Preferably, the syngas contains at least 250 vppb N-containing contaminants. More preferably, the syngas contains at least 500 vppb N-containing contaminants. Typically, the syngas contains at least 1000 vppb N-containing contaminants. Preferably, the syngas contains not more than 100000 vppb N-containing contaminants. More preferably, the syngas contains not more than 20000 vppb N-containing contaminants. Typically, the syngas may contain not more than 10000 vppb N-containing contaminants. For example, in one embodiment of the invention, the syngas may contain about 2000 vppb N-containing contaminants. However, in another embodiment, the syngas may contain about 5000 vppb N-containing contaminants. Typically, when the syngas is that of a gas-to-liquid process, it contains HCN and $NH_3$ as N-containing contaminants; when it is that of a coal-to-liquid process, it contains $NH_3$ and NO as N-containing contaminants.

Preferably, R in $R_xN H_{3-x}$ is a hydrocarbyl group and/or an oxygenated hydrocarbyl group. More preferably, R in $R_xNH_{3-x}$ is an alkyl group and/or an alcohol. Preferably, x is 1 or 2. In a preferred embodiment of the invention $R_xNH_{3-x}$ is dipropylamine $(CH_3CH_2CH_2)_2NH$. Alternatively, $R_xNH_{3-x}$ can be diethanolamine or methyl-diethanolamine.

Preferably, $R^1$ in $R^1$—CN is a hydrocarbyl group. More preferably, $R^1$ in $R^1$—CN is an alkyl group. In one preferred embodiment of the invention, $R^1$ is methyl.

The heterocyclic compounds may include oxygen containing groups. Examples of such oxygen containing compounds and non-oxygen containing compounds are 4-piperidineoacetophenone (heterocyclic with oxygen), 1,4-bipiperidine (heterocyclic, no oxygen), 1-piperidinepropionitrile (monocyclic), and 3-piperidino-1,2-propanediol (monocyclic with oxygen).

Alternatively the hydrocarbon synthesis process may be as set out above except that the synthesis gas contains no or less than 100 vppb of the N-containing contaminants as set out above.

In one preferred embodiment of the invention the catalyst may have been prepared by including
  in a carbide formation step, treating the activated catalyst, comprising the catalyst support supporting cobalt with a zero valency, with a CO containing gas (preferably at a temperature $T_1$, where $T_1$ is from 200° C. to 280° C.) to convert the cobalt to cobalt carbide thereby obtaining a cobalt carbide containing catalyst precursor; and
  in a subsequent activation step, subjecting the cobalt carbide containing catalyst precursor to treatment with a hydrogen containing gas (preferably at a temperature $T_2$, where $T_2$ is at least 300° C.) to convert the cobalt carbide to cobalt metal thereby activating the cobalt carbide containing catalyst precursor and obtaining a cobalt-containing hydrocarbon synthesis catalyst.

Preferably the hydrocarbon synthesis process is a Fischer-Tropsch process, preferably a three phase Fischer-Tropsch process, more preferably a slurry bed Fischer-Tropsch process for producing a wax product.

The water partial pressure in the slurry bed may reach at least 5 bar(a), preferably at least 8 bar(a). The total feed $H_2$/CO molar ratio may be from 1.4 to 2, preferably about 1.5, alternatively about 1.8. In an alternative embodiment, the water partial pressure in the slurry bed may be below 5 bar(a). The total feed $H_2$/CO molar ratio may be from 1.4 to 2, preferably about 1.6.

The hydrocarbon synthesis process may also include a hydroprocessing step for converting the hydrocarbons and optionally oxygenates thereof to liquid fuels and/or other chemicals.

According to a fifth aspect of the present invention, there is provided products produced by the hydrocarbon synthesis process as described above.

BRIEF DESCRIPTION OF THE FIGURES

The invention will now be described in more detail, by way of example only, with reference to the accompanying figures in which.

Figure 1:
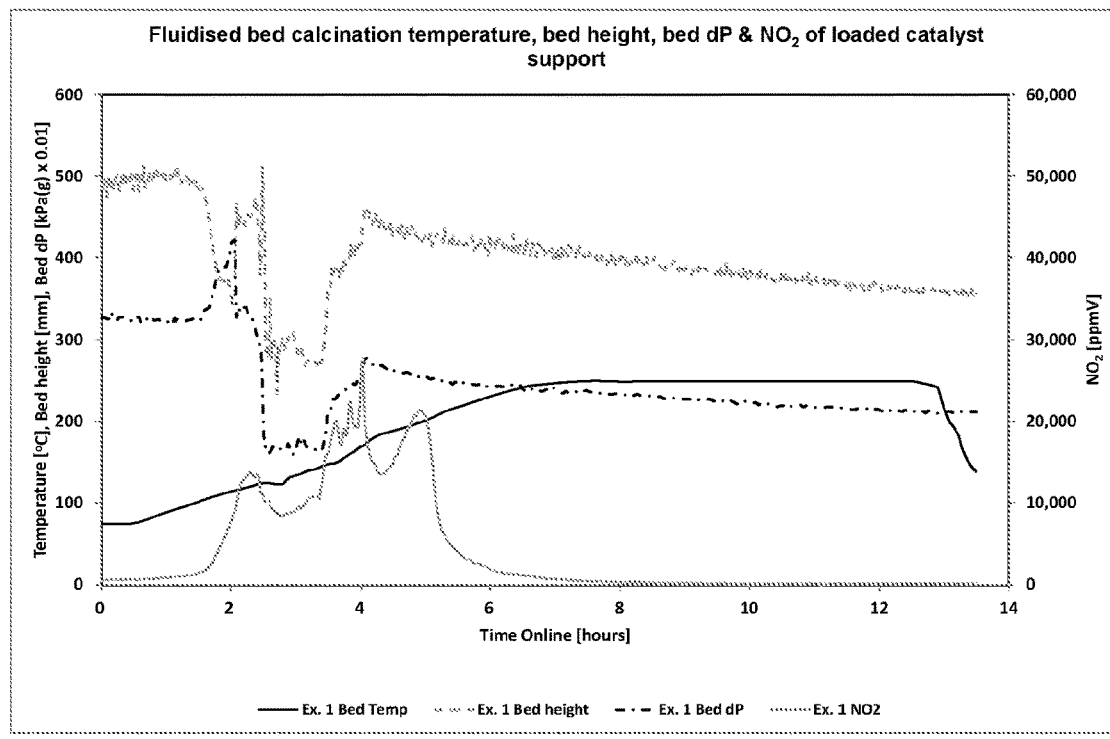
FIG. 1 shows a plot of low heating rate fluidized bed calcination temperature, bed height, bed dP & $NO_2$ concentration in respect of Example 1.

The foregoing and other objects, features and advantages of the present invention will become more apparent from the following description of certain embodiments of the present invention by way of the following non-limiting examples.

EXAMPLES

Definitions Relevant to the Examples

Semi-continuous feeding of the loaded catalyst support: The loaded catalyst support is fed into the calciner continuously or in a number of batches where the feed is combined (forming a bed) and held for a holding period. The combined feed is then unloaded in batch mode (preferably a single batch) after the holding period in the calciner.

Gas hourly space velocity (GHSV): For typical calcination of a loaded catalyst support supporting Co $(NO_3)_2 \cdot 6H_2O$, the GHSV (gas hour space velocity) is defined as $m_n{}^3{}_{air}/h/kg_{Co(NO3)2 \cdot 6H2O}$ and is calculated from the air flow $(m_n{}^3/h)$ (or air may be replaced with other suitable gas) divided by the total amount of $Co(NO_3)_2 \cdot 6H_2O$ loaded for a specific catalyst amount or batch. However, during semi-continuous feeding, a flow (kg/h) loaded catalyst support is effected instead of loading a full batch before starting with the calcination. In such a case the amount of $Co(NO_3)_2 \cdot 6H_2O$ used for expressing the GHSV is the amount of $Co(NO_3)_2 \cdot 6H_2O$ fed into the calciner in one hour. That is, if the gas flow is 20 $Nm^3$ per hour and 2 kg cobalt nitrate is fed in an hour, then the gas flow of 20 $Nm^3$ per hour is divided by 2 kg cobalt nitrate to provide a GHSV is 10 $Nm^3$ per/kg cobalt nitrate/hour.

Heating rate of the precursor: The heating rate of the loaded catalyst support refers to the rate at which the loaded catalyst support introduced into the calcination apparatus (calciner) is heated to reach the reactor temperature. That is the heating rate is the difference between the reactor temperature (end temperature) and the temperature of the loaded catalyst support as it is introduced into the reactor (start temperature) divided by the time it takes for the loaded catalyst support to reach the end temperature from the start temperature.

Turbidity: Ultra-fines, defined as <5 μm particles, are not always accurately measured by the PSD method (Saturn digisizer) or by sieving. Turbidity measurements are used instead to measure catalyst ultra-fines with ultrasonic treatment. Ultrasonic exposure of the catalyst dislodges fine particulates from the main particle which scatter or absorb light, giving the medium under investigation a cloudy appearance. A turbidity meter measures the intensity of scattered light. The higher the intensity of scattered light, the higher the turbidity reading that will be observed.

Turbidity was measured by filling four 100 ml beakers with 2.00 g of catalyst sample and 38 ml of deflocculated water, with a turbidity of <0.5 Nephelometric Turbidity Unit (NTU) and placing it in an ultrasonic bath filled with 700 ml water @ 25° C. The samples were exposed to ultrasound for four minutes @ 40 kHz frequency and 70 W ultrasonic power and measuring the turbidity in NTU.

Calcination at a high heating rate: Calcination at a heating rate higher than 10° C./min.

EXAMPLES

Example 1 (Comparative): Fluidised Bed Calcination of 30 g Co/0.075 g Pt/3.1 g Mn/100 g Ti—$SiO_2$ (C5121, pH=2.3) at a Low Heating Rate of 1° C./min Modified silica support: Titanium (IV) iso-propoxide (17.2 g) was added to dry ethanol (130 g) and allowed to mix for 10 minutes. 100 g Amorphous, pre-shaped CARiACT Q-30 silica-gel (average pore diameter of 30 nm), as obtained from Fuji Silysia Chemical Ltd., was added to the resulting solution and allowed to mix for a further 10 minutes. The ethanol was removed under reduced pressure using the drying profile in Table 1 to obtain a free flowing powder. The thus obtained Ti—$SiO_2$ modified catalyst support material was calcined in a muffle oven at 550° C. at a heating rate of 5° C./min and a final hold time of 5 hours. The resulting modified support included 2.6 g Ti/100 g $SiO_2$.

TABLE 1

Drying profile for the Ti impregnated modified catalyst support material

| Pressure (mbar) | Temperature (° C.) | Time (min) |
|---|---|---|
| 842 | 60 | 10 |
| 500 | 60 | 30 |
| 400 | 60 | 30 |
| 300 | 60 | 30 |
| 200 | 60 | 60 |
| 100 | 60 | 60 |
| 50 | 60 | 60 |

Catalyst precursor: In a first metal impregnation step, $Co(NO_3)_2·6H_2O$ (7.56 kg), $Mn(NO_3)_2·4H_2O$ (1.44 kg) and $(NH_4)_3Pt(NO_3)_2$ (5.06 g) were dissolved in water (12.24 kg). The pH of the solution was adjusted to 2.3 after the addition of the $Co(NO_3)_2·6H_2O$ using diluted nitric acid. 10.2 kg Ti—$SiO_2$ modified catalyst support material as described above was added to the solution and stirred for 10 minutes. The excess water was removed under reduced pressure in a conical dryer until the desired 33.3% of the $Co(NO_3)_2·6H_2O$ crystal waters were removed by using the drying profile in Table 2.

The percentage of crystal waters removed is calculated from the mass change measured during loss on ignition (LOI) at 400° C.

TABLE 2

Drying profile of the impregnated (loaded) catalyst support material

| Pressure [mbar] | Temperature [° C.] | Time [min] |
|---|---|---|
| atm | 60 | 10 |
| 220 | 60 | 15 |
| 220 | 75 | 30 |
| 220 | 85 | 30 |
| 220-120 | 85 | 120 |
| 120-50 | 100 | 180 |

The dried impregnated free flowing support material powder thus obtained was calcined in a fluidized bed calciner at a heating rate of 1° C./min to 250° C. with a hold time of 6 hours using a GHSV of 2.5 $Nm^3$air/kg (Co $(NO_3)_2·6H_2O$)/hour. The resulting catalyst precursor comprised of 15 g Co/0.0255 g Pt/3.1 g Mn/100 g Ti—$SiO_2$.

In a second metal impregnation step, $Co(NO_3)_2·6H_2O$ (6.62 kg) and $(NH_4)_3Pt(NO_3)_2$ (8.87 g) were dissolved in water (13.47 kg). The pH of the solution was adjusted to 2.3 using diluted nitric acid. The calcined material of the first impregnation step (11.2 kg) was added to the solution and stirred for 10 minutes. The excess water was removed under reduced pressure in a conical dryer until the desired 33.3% of the $Co(NO_3)_2·6H_2O$ crystal waters were removed by using the drying profile in Table 2. Similar fluidisation calcination conditions followed as applied to after the first impregnation step. The resulting catalyst precursor included 30 g Co/0.075 g Pt/3.1 g Mn/100 g Ti—$SiO_2$.

The particle size distribution of the catalyst precursor was analysed by means of a commercially available Saturn DigiSizer™ 5200 and the percentage of fine material smaller than 45 micron was reported to establish catalyst break-up.

Example 2 (Comparative): Fluidised Bed Calcination of 15 g Co/0.025 g Pt/3.1 g Mn/100 g Ti—$SiO_2$ at a Low Heating Rate of 5° C./min (C5459, pH=2.3)

A catalyst precursor was prepared as described in Example 1, but without the second metal impregnation step, and the dried impregnated free flowing support material powder obtained after the $1^{st}$ impregnation step was calcined in a fluidized bed calciner at a heating rate of 5° C./min as opposed to 1° C./min as described in Example 1. The resulting catalyst precursor comprised of 15 g Co/0.025 g Pt/3.1 g Mn/100 g Ti—$SiO_2$ Example 3 (Comparative): Fluidised Bed Calcination of 15 g Co/0.0255 gPt/2.5 g MAc/100 g Ti/Mn-Modified-$SiO_2$ (2.6 g Ti/3.1 g Mn/100 g $SiO_2$) at a High GHSV of 8.2 $Nm^3$Air/Kg (Co $(NO_3)_2·6H_2O$)/Hour (C2170, pH=2.3)

Modified support: Titanium (IV) iso-propoxide (2.57 kg) was added to dry ethanol (15.9 kg) and allowed to mix for 10 minutes. Amorphous, preshaped silica-gel (15 kg), CARiACT Q-30, as obtained from Fuji Silysia, was added to this solution and allowed to mix for a further 10 minutes. The ethanol was removed under reduced pressure using the drying profile in Table 3 to obtain a free flowing powder.

TABLE 3

Drying profile for the modified catalyst support material

| Pressure (mbar) | Temperature (° C.) | Time (min) |
|---|---|---|
| 842 | 60 | 10 |
| 500 | 60 | 30 |
| 400 | 60 | 30 |
| 300 | 60 | 30 |
| 200 | 65 | 60 |
| 100 | 75 | 60 |

Manganese(II)acetate tetrahydrate (2.07 kg) was dissolved in water (22.5 kg) and allowed to mix for 10 minutes. The free flowing powder obtained from the titanium (IV) iso-propoxide modified silica (17.6 kg) was added to this solution and allowed to mix for a further 10 minutes. The water was removed under reduced pressure using the drying profile in Table 3 to obtain a free flowing powder. The support material was calcined in a muffle oven to 550° C. at a heating rate of 5° C./min and a final hold time of 5 hours. The resulting TiMn—$SiO_2$ modified catalyst support included 3.1 g Mn/2.6 g Ti/100 g $SiO_2$.

Catalyst precursor: In a first impregnation step, 7.9 kg $Co(NO_3)_2·6H_2O$ was dissolved in water (10.31 kg) and the pH of the solution was adjusted to 2.3 using diluted nitric acid. Maleic acid (MAc) (250 g) and $(NH_4)_3Pt(NO_3)_2$ (5.06 g) were thereafter added to the solution. The MnTi—$SiO_2$ (10 kg) modified catalyst support was added to the mixture and the excess water removed under reduced pressure using the drying profile in Table 4 to obtain a free flowing powder.

TABLE 4

Drying profile for impregnated catalyst support material

| Pressure (mbar) | Temperature (° C.) | Time (min) |
|---|---|---|
| Atm | 60 | 10 |
| 220 | 60 | 15 |
| 220 | 75 | 30 |
| 220 | 85 | 30 |
| 220-120 | 85 | 120 |
| 120-50 | 95 | 180 |

The free flowing powder was calcined in a fluidized bed calciner at a heating rate of 0.5° C./min to 250° C. with a hold time of 6 hours using a GHSV of 8.2 Nm$^3$air/kg (Co(NO$_3$)$_2$·6H$_2$O)/hour. The resulting catalyst precursor comprised of 15 g Co/0.0255 g Pt/2.5 g MAc/100 g Ti/Mn-modified-SiO$_2$ (2.6 g Ti/3.1 g Mn/100 g SiO$_2$) after the first impregnation.

Example 4 (Inventive): Fluidised Bed Calcination of 30 g Co/0.075 g Pt/3.1 g Mn/100 g Ti—SiO$_2$ at a High Heating Rate of 67° C./min at 210° C. (C2173≡C5134, pH=2.3)

Dried metal impregnated catalyst support material was prepared as described in Example 1; however, the loaded support material was fed semi-continuously at a high heating rate into a fluidised bed calciner as opposed to fluidisation calcination as described in Example 1.

The high heating rate calcination was performed by feeding small, multiple batches of impregnated catalyst support material via a flush spool piece to a pre-heated 6 inch fluidized bed reactor or continuously via a rotary valve during commercial production to control a constant NO$_2$ release. The calciner was pre-heated under air flow to a reactor temperature of 210° C. 75-100 g impregnated catalyst support material was loaded by flashing the material using a flush spool piece with nitrogen into the reactor. The procedure was repeated every 4-10 minutes in a period of 10-12 hours for ~10 kg batches. With a loading size of 75 g and air flow of 10 kg/h, the maximum concentration of NO$_2$ in the off-gas was calculated to be ±15000 ppm. Once all the material was loaded into the fluidised bed calciner, the reactor temperature was increased to 250° C. for final hold and held for a period until all remaining NO$_2$ was released. The high heating rate calcination conditions and final hold are summarised in Table 5. The resulting catalyst precursor comprised of 15 g Co/0.0255 g Pt/3.1 g Mn/100 g Ti—SiO$_2$.

TABLE 5

High heating rate fluidised bed calcination conditions

High heating rate calcination

| Average solids feed rate | kg/h | 1.26 |
|---|---|---|
| Air flow | kg/h | 9.2 |
| Linear gas velocity | cm/s | 13.7 |
| GHSV | Nm$^3$air/kg$_{Co(NO3)2·6H2O}$ | 14.76 |
| Reactor temperature | ° C. | 210 |
| Heating rate of precursor | ° C./min | 67 |
| NO$_2$ concentration | ppm (average) | 6 000-9 000 |
| NO$_2$ concentration | mol/kg catalyst | 2.21 |
| Feed time | h | 10-12 |

TABLE 5-continued

High heating rate fluidised bed calcination conditions

Final hold

| Reactor temperature | ° C. | 250 |
|---|---|---|
| Heating rate | ° C./min | 0.5 |
| Hold time | h | 6 |

A second active metal impregnation step followed as described in Example 1 and calcined at a high heating rate as described above in Table 5 to form a catalyst with a composition of 30 g Co/0.075 g Pt/3.1 g Mn/100 g Ti—SiO$_2$.

Example 5: Catalyst Activation

The calcined catalyst precursors as described above in Example 1 and Example 4 were reduced prior to Fischer-Tropsch synthesis (FTS) over a H$_2$ flow with a GHSV of 2.0 Nm$^3$/hr/kg calcined catalyst and a heating rate of 1° C./min to 390° C. and hold for 7 hours. The reduced catalyst was cooled down, embedded in molten wax and loaded in a continuous stir tank reactor (CSTR) under an inert gas blanket.

Example 6: Fischer-Tropsch Synthesis (FTS)

The FTS performance of the activated, wax protected catalysts as described in Example 5 were evaluated on a laboratory micro slurry CSTR at a reactor temperature of 230° C. and a reactor pressure of about 15 bar over a total feed molar H$_2$/CO ratio of about 1.5/1. The reactor was electrically heated and sufficiently high stirrer speeds were employed as to eliminate any gas-liquid mass transfer limitations. The feed gas space velocity was changed such that the syngas conversion was around 75-78%. The water partial pressure was about 5.5 bar.

Discussion

Figure 2:
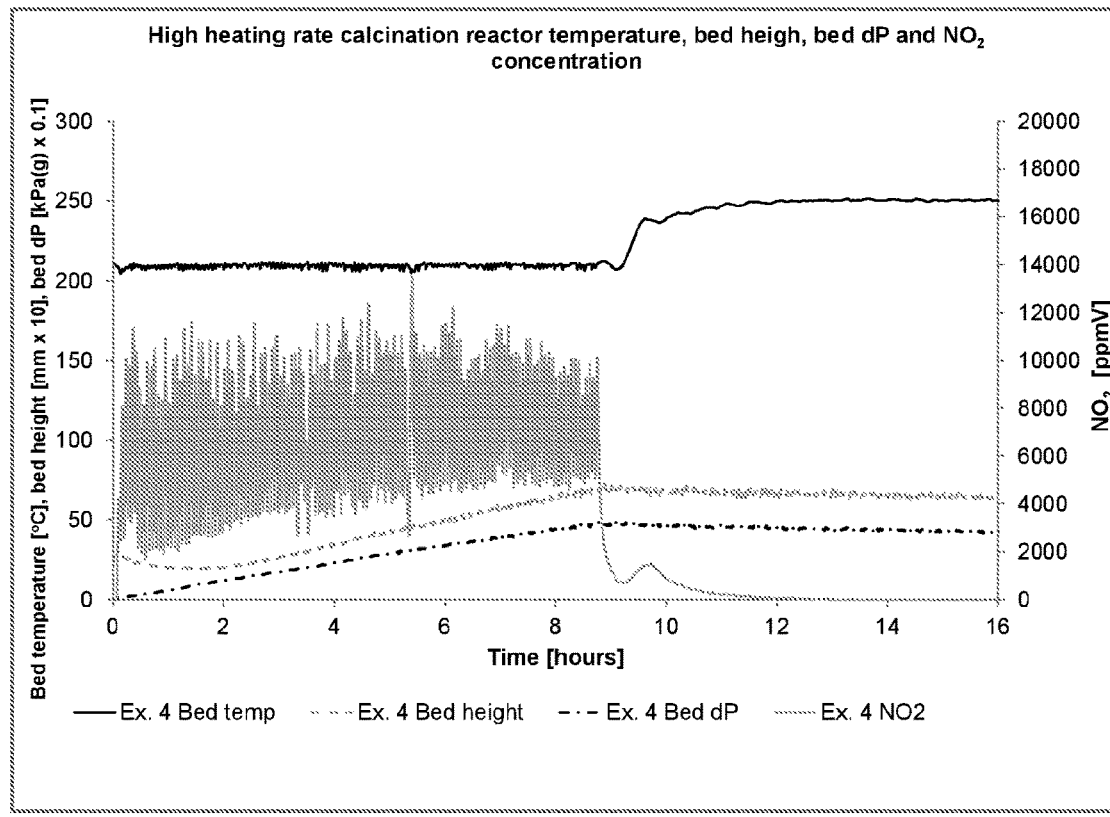
FIG. 2 shows a plot of high heating rate fluidized bed calcination temperature, bed height, bed dP and $NO_2$ concentration in respect of Example 4.
Figure 3:
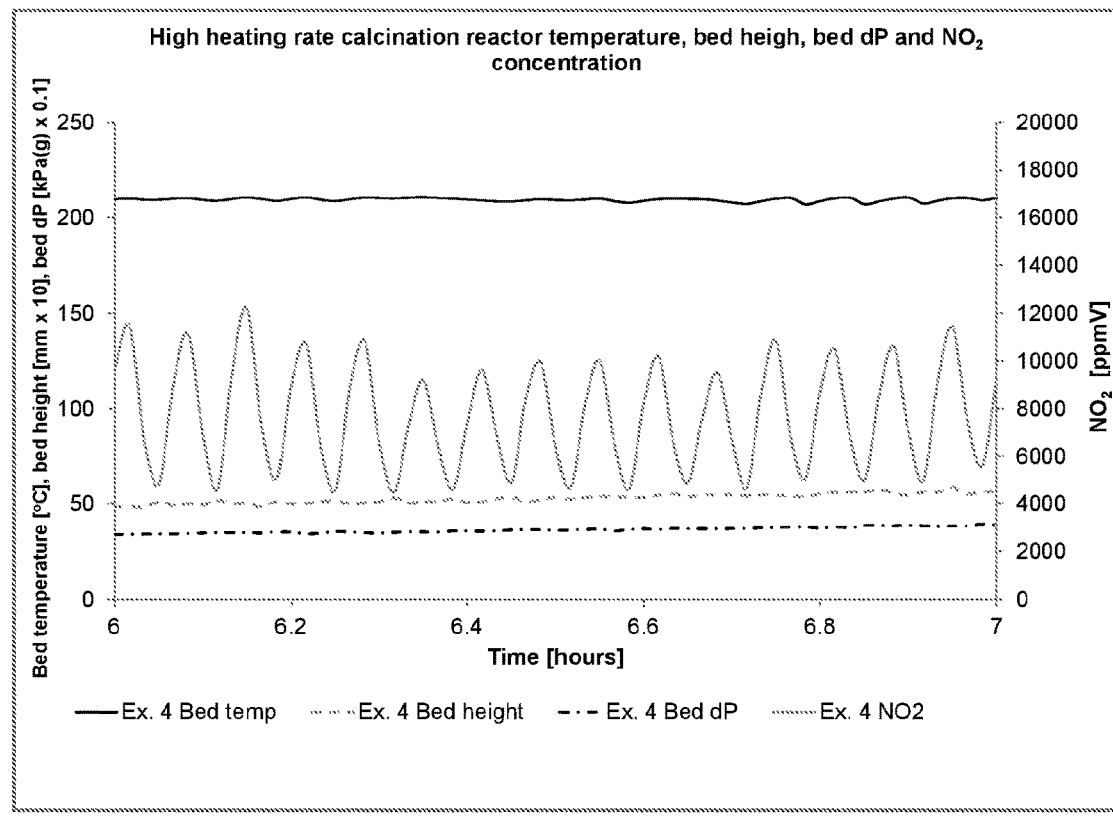
FIG. 3 shows a 1 hour period enlargement of the calcination profile of FIG. 2.

Poor fluidisation stability, that is, either dP instability or NO$_2$ profile scatter or temperature scatter over the bed, was observed for the fluidised calcined catalyst precursors as described in Example 1 (see FIG. 1) whereas the high heating rate fluidised calcined catalyst precursor as described in Example 4 demonstrated good fluidisation stability at a reactor bed temperature of 210° C. (see FIG. 2) with no dP instability and temperature scatter. A 1 hour period enlargement of the calcination profile of FIG. 2 is shown in FIG. 3 and demonstrates controlled, multiple single NO$_2$ peaks during calcination at high heating rates.

Figure 4:
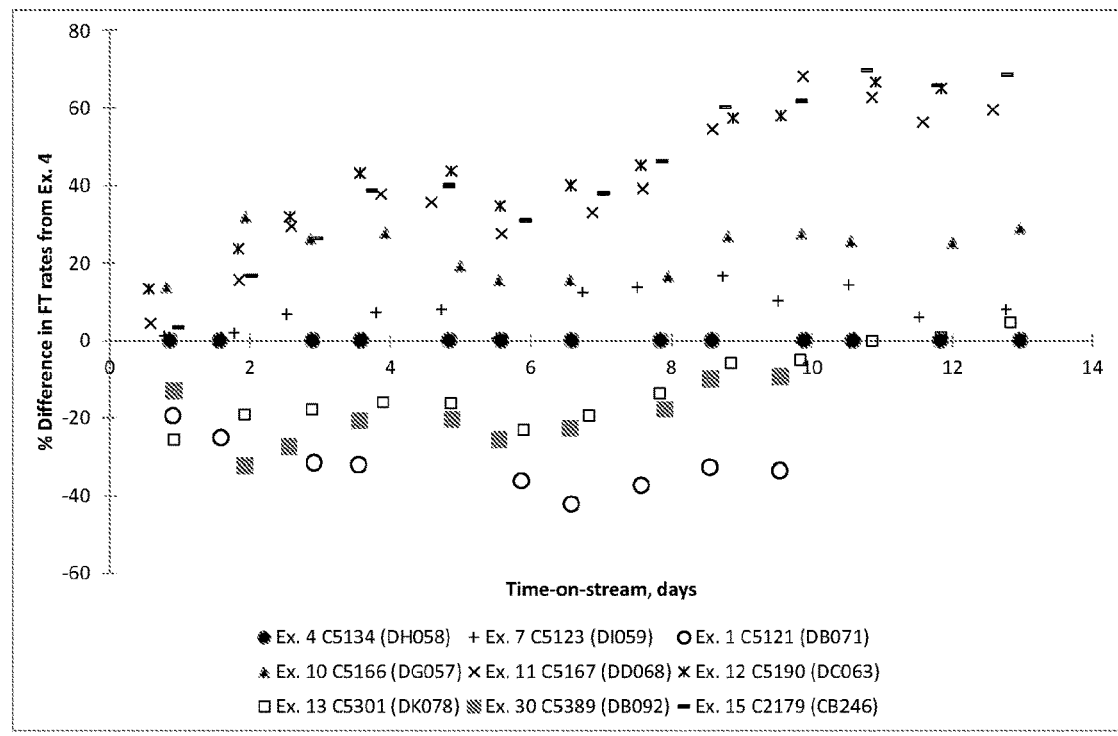
FIG. 4 shows a plot of % difference in FTS rates in respect of examples 1, 7, 10, 11, 12, 13, 15 and 30 with reference to that of Example 4.

The Co$_3$O$_4$ crystallite size of the high heating rate calcined catalyst precursor (Example 4) was smaller than the fluidisation bed calcination catalyst precursor of Example 1 and Example 2 (see Table 6) and resulted in a FTS catalyst with higher activity compared to the low heating rate fluidised bed calcination as described in Example 1 (see FIG. 4). Increasing the heating rate during fluidised bed calcination to 5° C./min in Example 2 did not solve the poor fluidisation as is evident from the large Co$_3$O$_4$ crystallite sizes observed which may be due to migration of the cobalt (see Table 6).

Even though no bed dP instability was observed at the high GHSV of 8 Nm$^3$air/kg (Co(NO$_3$)$_2$·6H$_2$O)/hour of Example 3, a NO$_2$ profile scatter was still observed which typically yields poor catalyst quality.

Similar to the low percentage of 1.7% fine material smaller than 45 micron in the catalyst precursor of Example 1 that was calcined at a low heating rate, the percentage of fine material smaller than 45 micron in the catalyst precursor of Example 4 was only 1.3% (see Table 6) and is indicative of very low break-up of the catalyst precursor calcined at a high heating rate.

TABLE 6

Fluidised bed calcination stability and catalyst precursor characteristics when the loaded support was fed semi-continuously at a high heating rate to the calciner versus low heating rate calcination

| Catalyst, | Fluidised bed calcination method | Heating rate, °C./min | GHSV, Nm³/ $kg_{Co(NO3)2 \cdot 6H2O}$ | $Co_3O_4$ crystallite size, nm | Indication of poor fluidisation | Fines <45 μm (%) |
|---|---|---|---|---|---|---|
| Example 1 ex 1$^{st}$ impregnation | Low heating rate | 1 | 2.5 | 24 | dP instability, $NO_2$ profile scatter | |
| Example 1 ex 2$^{nd}$ impregnation | | | | 34 | | 1.7 |
| Example 2 ex 1$^{st}$ impregnation | Low heating rate | 5 | 2.5 | 32 | | |
| Example 3 ex 1$^{st}$ impregnation | Low heating rate | 0.5 | 8.2 | — | $NO_2$ profile scatter | |
| Example 4 ex 1$^{st}$ impregnation | High heating rate | 67 | 14.76 | 12 | none | |
| Example 4 ex 2$^{nd}$ impregnation | | | | 16 | | 1.3 |

Example 7 (Inventive): Fluidised Bed Calcination of 30 g Co/0.075 g Pt/3.1 g Mn/100 g Ti—SiO$_2$ at a High Heating Rate of 106° C./min at 210° C. (C5123≡C2173 Small Scale, pH=2.3)

A catalyst precursor was prepared as described in Example 4, but on a smaller scale; that is, 50 g support material was used as opposed to 10 kg or 15 kg support material. All other raw materials used during the catalyst precursor preparation were scaled down accordingly. The high heating rate calcination conditions and final hold are summarised in Table 7. A continuous catalyst precursor feed rate of 0.7 g/min was used.

TABLE 7

Small laboratory scale high heating rate fluidised bed calcination conditions

| High heating rate calcination | | |
|---|---|---|
| Average solids feed rate | kg/h | 0.042 |
| Air flow | kg/h | 0.2 |
| Linear gas velocity | cm/s | 5.97 |
| GHSV | Nm³air/kg$_{Co(NO3)2 \cdot 6H2O}$ | 9.63 |
| Reactor temperature | ° C. | 210 |
| Heating rate of precursor | ° C./min | 106 |
| NO$_2$ concentration | ppm (average) | 14 000 |
| NO$_2$ concentration | mol/kg catalyst | 2.22 |
| Final hold | | |
| Reactor temperature | ° C. | 250 |
| Heating rate | ° C./min | 1 |
| Hold time | h | 6 |

The catalyst precursor was activated as described in Example 5 and the resulting catalyst thereafter tested for its slurry phase FTS performance on a micro slurry CSTR under conditions as described in Example 6.

Example 8 (Comparative): Fluidised Bed Calcination of 15 g Co/0.0255 g Pt/3.1 g Mn/100 g Ti—SiO$_2$ at a High Heating Rate of 15° C./min at 120° C. (C5128, pH=2.3)

A catalyst precursor was prepared as described in Example 7, but without the second metal impregnation step and the calcination bed temperature applied to the bed was 120° C. as opposed to 210° C. as described in Example 7. The final hold period was similar to Example 7 (Table 7).

Example 9 (Inventive): Fluidised Bed Calcination of 30 g Co/0.075 g Pt/3.1 g Mn/100 g Ti—SiO$_2$ at a High Heating Rate of 106° C./min at 210° C. with Final Hold at 340° C. (C5143, pH=2.3)

A catalyst precursor with the composition 30 g Co/0.075 g Pt/3.1 g Mn/100 g Ti—SiO$_2$ was prepared as described in Example 7; however, the final hold temperature of the bed was 340° C. as opposed to 250° C.

Discussion

The impregnated catalyst support that was calcined at a high heating rate of 15° C./min to only 120° C. (Example 8) (and not to at least 165° C.) resulted in a catalyst precursor with large Co$_3$O$_4$ crystallite sizes compared to Example 7 and Example 9. Smaller Co$_3$O$_4$ crystallite sizes were obtained for the catalyst precursors that were calcined at 210° C.; that is, calcination over the full temperature range A (see Examples 7 and Example 9).

Similar Co$_3$O$_4$ crystallite sizes were obtained with a final hold temperature of 340° C. (Example 9) as compared to a final hold temperature of 250° C. (Example 7).

TABLE 8

High heating rate fluidised bed calcination results at various reactor temperatures and final hold bed temperatures

| Catalyst | Reactor bed T, ° C. | Heating rate of precursor, ° C./min | GHSV, Nm³/mol NO$_3$ (Nm³/kg Co(NO$_3$)$_2$·6H$_2$O) | Final hold T, ° C. | Co$_3$O$_4$ Crystallite size, nm | Turbidity, NTU |
|---|---|---|---|---|---|---|
| Example 4 ex 1$^{st}$ impregnation | 210 | 67 | 1.84 (14.76) | 250 | 12 | 83 |
| Example 4 ex 2$^{nd}$ impregnation | 210 | 67 | 1.84 (14.76) | 250 | 16 | 62 |

TABLE 8-continued

High heating rate fluidised bed calcination results at various reactor temperatures and final hold bed temperatures

| Catalyst | Reactor bed T, ° C. | Heating rate of precursor, ° C./min | GHSV, Nm³/mol NO₃ (Nm³/kg Co(NO₃)₂•6H₂O) | Final hold T, ° C. | Co₃O₄ Crystallite size, nm | Turbidity, NTU |
|---|---|---|---|---|---|---|
| Example 7 ex 1$^{st}$ impregnation | 210 | 106 | 1.20 (9.63) | 250 | 14 | — |
| Example 8 ex 1$^{st}$ impregnation | 120 | 15 | 1.20 (9.63) | 250 | 48 | 118 |
| Example 9 ex 2$^{nd}$ impregnation | 210 | 106 | 1.20 (9.63) | 340 | 16 | — | ex 1$^{st}$ impregnation = 15 g Co/0.0255 g Pt/3.1 g Mn/100 g support (2.6 g Ti/100 gSiO₂)
ex 2$^{nd}$ impregnation = 30 g Co/0.075 g Pt/3.1 g Mn/100 g support (2.6 g Ti/100 gSiO₂)

Example 10 (Inventive): Fluidised Bed Calcination of 30 g Co/0.075 g Pt/2.2 g Mn/100 g Ti—SiO₂ at a High Heating Rate of 106° C./min at 210° C. (C5166, pH=2.3)

A catalyst precursor was prepared as described in Example 7; however, the Mn(NO₃)₂·4H₂O loading during the 1$^{st}$ impregnation step was reduced to give a catalyst precursor composition of 30 g Co/0.075 g Pt/2.2 g Mn/100 g Ti—SiO₂. The final hold period was similar to Example 7 (Table 7).

The catalyst precursor was activated as described in Example 5 and the resulting catalyst thereafter tested for its slurry phase FTS performance on a micro slurry CSTR under conditions as described in Example 6.

Example 11 (Inventive): Fluidised Bed Calcination of 30 g Co/0.075 g Pt/2.2 g Mn/100 g Ti—SiO₂ at a High Heating Rate of 106° C. at 210° C. (C5167≡C2178, pH=5)

A catalyst precursor with composition 30 g Co/0.075 g Pt/2.2 g Mn/100 g Ti-silica support (2.6 g Ti/100 g silica) was prepared as described in Example 10. However, the first impregnation entailed the addition of 1 gram cobalt hydroxide in addition to cobalt nitrate, changing the pH of the solution to 5. The pH of the second impregnation solution was again adjusted to 2.3 with no cobalt hydroxide addition.

The precursor was prepared as follows: Modified silica support material as described in Example 1 was used as support material. Co(NO₃)₂·6H₂O (34.57 g) and (NH₄)₃Pt(NO₃)₂ (0.025 g) were added to 60 g of water and stirred for 10 minutes at 85° C. to allow dissolution of the cobalt nitrate and platinum salts. The pH was adjusted to 2.3 using dilute nitric acid. Co(OH)₂ (0.79 g) and Mn(NO₃)₂·4H₂O (5.02 g) were added to the solution. The pH of the turbid solution exceeded 4.5. No further pH adjustments were made and the solution was stirred for another 10 minutes at 85° C. 50 g Ti-modified support was added to the solution. The excess water was removed under reduced pressure using the drying profile as described in Table 9 to obtain a free flowing powder. The loaded support was fed continuously at a high heating rate into a fluidised bed calciner at conditions as described in Example 7, Table 7. The catalyst precursor comprised of 15 g Co/0.025 g Pt/2.2 g Mn/100 g Ti—SiO₂ with 1 g of the Co from Co(OH)₂.

In a second impregnation step, Co(NO₃)₂·6H₂O (30.75 g) and (NH₄)₃Pt(NO₃)₂ (0.049 g) were dissolved in water (60 g) and the pH of the solution was adjusted to 2.3 using diluted nitric acid. The calcined material of the first impregnation step (50 g) was added to the solution and stirred for 10 minutes. The excess water was removed under reduced pressure using the drying profile as described in Table 9 to obtain a free flowing powder with a LOI₄₀₀ of 23.8% (35.2% of the Co(NO₃)₂·6H₂O crystal waters were removed).

TABLE 9

Drying profile of the impregnated catalyst support material

| Pressure [mbar] | Temperature [° C.] | Time [min] |
|---|---|---|
| 250 | 85 | 30 |
| 250-130 | 85 | 120 |
| 130-50 | 85 | 15 |
| 50 | 85 | 180 |

The catalyst precursor was activated as described in Example 5 and the resulting catalyst thereafter tested for its slurry phase FTS performance on a micro slurry CSTR under conditions as described in Example 6.

Example 12 (Inventive): Fluidised Bed Calcination of 30 g Co/0.075 g Pt/1.6 g Mn/100 g Ti—SiO₂ at a High Heating Rate of 106° C./min at 210° C. (C5190, pH=5)

A catalyst precursor was prepared as described in Example 11; however, the Mn(NO₃)₂·4H₂O loading during the 1$^{st}$ impregnation step was reduced to give a catalyst precursor composition of 30 g Co/0.075 g Pt/1.6 g Mn/100 g Ti—SiO₂. The final hold period was similar to Example 7 (Table 7).

The catalyst precursor was activated as described in Example 5 and the resulting catalyst thereafter tested for its slurry phase FTS performance on a micro slurry CSTR under conditions as described in Example 6.

Example 13 (Comparative): Fluidised Bed Calcination of 30 g Co/0.075 g Pt/2.2 g Mn/100 g Ti—SiO₂ (C5301, pH=5) at a Low Heating Rate of 1° C./min A catalyst precursor was prepared as described in Example 11; however, the impregnated support was calcined as described in Example 1; that is, fluidised bed calcination at a heating rate of 1° C./min to 250° C. with a hold time of 6 hours using a GHSV of 2.5 Nm³air/kg (Co(NO₃)₂·6H₂O)/hour.

The catalyst precursor was activated as described in Example 5 and the resulting catalyst thereafter tested for its slurry phase FTS performance on a micro slurry CSTR under conditions as described in Example 6.

Discussion

From Table 10 the active metal surface area (MSA) of Example 12 (1.6 g Mn loading/100 g Ti—$SiO_2$) is the highest compared to Example 10 and Example 11 and the reduction temperature thereof the lowest compared to Example 7, Example 10 and Example 11. The FTS activity of Example 10 with a 2.2 g Mn/100 g support is higher compared to the 3.1 g Mn/100 g support of Example 7 (see FIG. 4). The higher pH obtained with the addition of $Co(OH)_2$ during the $1^{st}$ impregnation step (Example 11 and Example 12), then again, resulted in an even higher FTS activity compared to the lower pH impregnation solution of Example 10 (see FIG. 4).

TABLE 10

Characteristics of the catalyst precursors calcined at high heating rates (the reactor temperature was 210° C. and final hold 250° C.)

| Catalyst | Mn level/100 g support | $1^{st}$ impregnation pH | pH agent | Ex $2^{nd}$ impregnation $Co_3O_4$ crystallite size, nm | Active metal surface area ($m^2$/g) @ 390° C. reduction | Reduction T of CoO to Co, ° C. |
|---|---|---|---|---|---|---|
| Example 7 | 3.1 | 2.3 | $HNO_3$ | 16 | | 268 |
| Example 10 | 2.2 | 2.3 | $HNO_3$ | 16 | 5.9 | 250 |
| Example 11 | 2.2 | 5 | $Co(OH)_2$ | 15 | 5.2 | 262 |
| Example 12 | 1.6 | 5 | $Co(OH)_2$ | 16 | 6.6 | 236 |

Similar to comparing low heating rate fluidised bed calcination of Example 1 with high heating rate calcination of Example 4, the $Co_3O_4$ crystallite size of the fluidised bed calcination catalyst precursor of Example 13 was larger than the high heating rate fluidised calcined catalyst precursor of Example 11 (see Table 11) and resulted in a FTS catalyst with lower activity (see FIG. 4) compared to high heating rate calcination.

Even though a lower Mn level and increased pH during the $1^{st}$ impregnation step improved the FTS performance of Example 13 compared to Example 1, fluidisation instability was still observed during low heating rate fluidised bed calcination.

TABLE 11

Comparison in catalyst precursor characteristics when calcined at a high heating rate versus a low heating rate.

| Catalyst, | Mn level/100 g support | $1^{st}$ impregnation pH | Fluidised bed calcination method | $Co_3O_4$ crystallite size, nm | Indication of poor fluidisation | % Difference in FT rate from Ex. 4 after 10 days |
|---|---|---|---|---|---|---|
| Example 1 | 3.1 | 2.3 | Low heating rate | 34 | dP instability | −33.5 |
| Example 4 | 3.1 | 2.3 | High heating rate | 16 | none | 0 |
| Example 11 | 2.2 | 5 | High heating rate | 15 | none | 68.1 |
| Example 13 | 2.2 | 5 | Low heating rate | 21 | dP instability | −5.0 |

Example 14 (Inventive): Fluidised Bed Calcination of 30 g Co/0.075 g Pt/2.2 g Mn/100 g Ti—SiO$_2$ at a High Heating Rate of 138° C./min at 250° C., No Final Hold Time, but 20 Minutes Residence Time as a Result of Loading Inventory (C5315, pH=5)

A catalyst precursor was prepared as described in Example 11; however, the calcination bed temperature applied to the bed was 250° C. The catalyst precursor was removed from the calciner immediately after the whole inventory was loaded.

Discussion

The small NO$_2$ peak in the NO$_2$ profile once the bed is heated from 210° C. to 250° C. in FIG. 2 indicates that the high heating rate fluidisation calcination does not remove all the traces of NO$_2$. From CHNS elemental analysis and the Co$_3$O$_4$ phase abundance XRD data, a final hold period of >20 minutes is required to get rid of all these residual nitrogen compounds (see Table 12).

TABLE 12

Minimum final hold time

| Catalyst | Reactor bed T, ° C. | Final hold T, ° C. | Final hold time, min | Co$_3$O$_4$ Crystallite size, nm | Relative phase abundance, % | | | | | N-content, % from CHNS analysis |
|---|---|---|---|---|---|---|---|---|---|---|
| | | | | | Co$_3$O$_4$ | Co$_2$SiO$_4$ | Co(NO$_3$)$_2$•(H$_2$O)$_2$ | Mn(NO$_3$)$_2$•(H$_2$O)$_2$ | Anatase TiO$_2$ | |
| Ex. 11 | 210 | 250 | 360 | 15 | 70 | 22 | | | 8 | 0.21 |
| Ex. 14 | 250 | 250 | 20 | 15 | 29 | 32 | 18 | 21 | | 2.87 |

Example 15 (Inventive): Fluidised Bed Calcination of 30 g Co/0.075 g Pt/2.2 g Mn/100 g Ti—SiO$_2$ at a High Heating Rate 68° C./min at 210° C. (C2179, pH=5)

A catalyst precursor was prepared as described in Example 11; but on a larger scale; that is, 15 kg Ti-modified catalyst support material as described in Example 1 was used as opposed to 50 g support material. All other raw materials used during the catalyst precursor preparation were scaled accordingly. The excess water was removed under reduced pressure in a conical dryer using the drying profile as described in Table 2 to obtain a free flowing powder. 44% of the Co(NO$_3$)$_2$·6H$_2$O crystal waters was removed. The dried impregnated support material was unloaded and divided into small batches for pilot plant calcination at 210° C. as described in Example 4, Table 5. The final hold period was similar to Example 4 (Table 5).

Example 16 (Inventive): Fluidised Bed Calcination of 15 g Co/0.025 g Pt/2.2 g Mn/100 g Ti—SiO$_2$ at a High Heating Rate of 48° C./min at 180° C. (C2179, pH=5)

A catalyst precursor was prepared as described in Example 15, but without the second metal impregnation step, and the calcination reactor temperature applied to the bed after the 1$^{st}$ impregnation step was 180° C. as opposed to 210° C. as described in Example 15.

Example 17 (Inventive): Fluidised Bed Calcination of 15 g Co/0.025 g Pt/2.2 g Mn/100 g Ti—SiO$_2$ at a High Heating Rate of 144° C./min at 250° C. (C2179, pH=5)

A catalyst precursor was prepared as described in Example 15, but without the second metal impregnation step, and the calcination reactor temperature applied to the bed after the 1$^{st}$ impregnation step was 250° C. as opposed to 210° C. as described in Example 15.

Example 18 (Comparative): Fluidised Bed Calcination of 15 g Co/0.025 g Pt/2.2 g Mn/100 g Ti—SiO$_2$ at a High Heating Rate of 30° C./min at 130° C. (C5517 Small Scale, Run DI092, pH=5)

A catalyst precursor was prepared as described in Example 11, but without the second metal impregnation step, and the calcination reactor temperature applied to the bed after the 1$^{st}$ impregnation step was 130° C. prior to the final hold period as opposed to 210° C. as described in Example 11. The final hold period was similar to Example 7 (Table 7).

Example 19 (Comparative): Fluidised Bed Calcination of 15 g Co/0.025 g Pt/2.2 g Mn/100 g Ti—SiO$_2$ at a High Heating Rate of 38° C./min at 140° C. (C5446 Small Scale, Run DG093, pH=5)

A catalyst precursor was prepared as described in Example 11, but without the second metal impregnation step, and the calcination reactor temperature applied to the bed after the 1$^{st}$ impregnation step was 140° C. prior to the final hold period as opposed to 210° C. as described in Example 11. The final hold period was similar to Example 7 (Table 7).

Example 20 (Comparative): Fluidised Bed Calcination of 15 g Co/0.025 g Pt/2.2 g Mn/100 g Ti—SiO$_2$ at a High Heating Rate of 48° C./min at 150° C. (C5491 Small Scale, Run DD079, pH=5)

A catalyst precursor was prepared as described in Example 11, but without the second metal impregnation step, and the calcination reactor temperature applied to the bed after the 1st impregnation step was 150° C. prior to the final hold period as opposed to 210° C. as described in Example 11. The final hold period was similar to Example 7 (Table 7).

Example 21 (Comparative): Fluidised Bed Calcination of 15 g Co/0.025 g Pt/2.2 g Mn/100 g Ti—SiO$_2$ at a High Heating Rate of 53° C./min at 160° C. (C5506 Small Scale, Run DI091, pH=5)

A catalyst precursor was prepared as described in Example 11, but without the second metal impregnation step, and the calcination reactor temperature applied to the bed after the 1st impregnation step was 160° C. prior to the final hold period as opposed to 210° C. as described in Example 11. The final hold period was similar to Example 7 (Table 7).

Example 22 (Inventive): Fluidised Bed Calcination of 15 g Co/0.025 g Pt/2.2 g Mn/100 g Ti—SiO$_2$ at a High Heating Rate of 66° C./min at 170° C. (C5503 Small Scale, Run DC088, pH=5)

A catalyst precursor was prepared as described in Example 11, but without the second metal impregnation step, and the calcination reactor temperature applied to the bed after the 1st impregnation step was 170° C. prior to the final hold period as opposed to 210° C. as described in Example 11. The final hold period was similar to Example 7 (Table 7).

Example 23 A: Catalyst Activation and Fischer-Tropsch Synthesis (FTS)

Samples of the calcined catalyst precursors of Example 16-Example 22 were reduced after the first impregnation step over a H$_2$ flow with a GHSV of 2.0 Nm$^3$/hr/kg calcined catalyst and at a heating rate of 1° C./min to 370° C. and hold for 7 hours. The reduced catalyst was cooled down, embedded in molten wax and loaded in a continuous stir tank reactor (CSTR) under an inert gas blanket to evaluate the Fischer-Tropsch synthesis performance thereof.

The FTS performance of the activated, wax protected catalysts as described above was evaluated on a laboratory micro slurry CSTR at a reactor temperature of 230° C. and a reactor pressure of about 20 bar over a total feed molar Hz/CO ratio of about 2/1. The reactor was electrically heated and sufficiently high stirrer speeds were employed as to eliminate any gas-liquid mass transfer limitations. The feed gas space velocity was changed such that the syngas conversion was around 80%. The water partial pressure was about 8 bar.

Discussion

Figure 5:
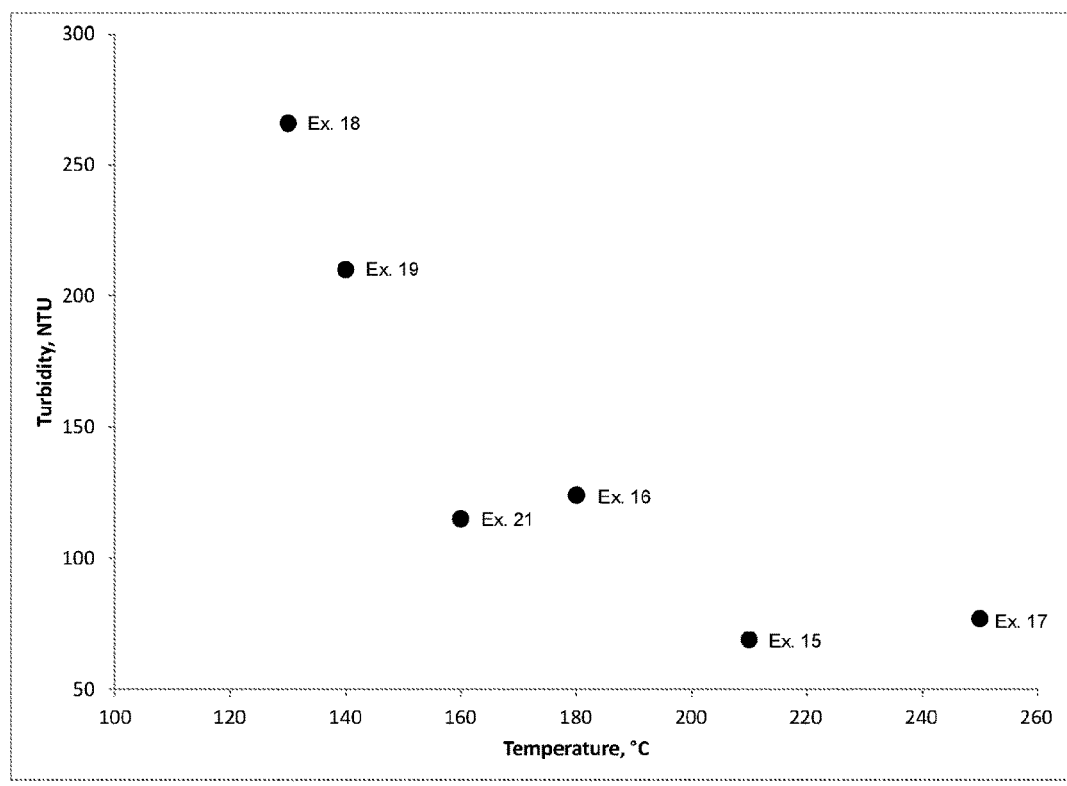
FIG. 5 shows a plot of turbidity as a function of reactor temperature in respect of examples 15 to 19 and 21.

Turbidity results indicate that less ultra-fines form by increasing the calcination reactor temperature with lowest turbidity readings for calcination reactor temperatures of 210° C. (Example 15) and 250° C. (Example 17) of FIG. 5.

Figure 6:
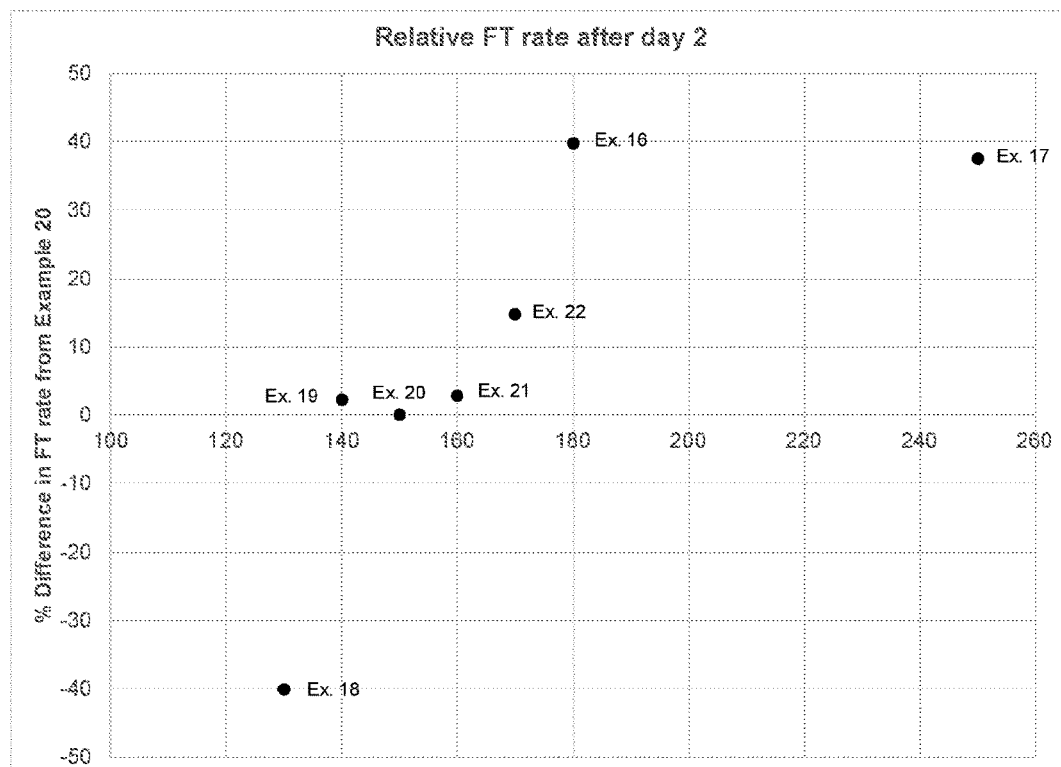
FIG. 6 shows a plot of % difference in FTS rates from Example 20 as a function of reactor temperature in respect of examples 16 to 22.

The impregnated catalyst support of Example 18 that was calcined at a high heating rate up to 130° C. resulted in catalyst precursors with very large Co$_3$O$_4$ crystallite sizes (see Table 13) as compared to the higher temperature calcination example of Example 22. The FTS activity was also significantly lower for the catalyst of Example 18 (see FIG. 6). The FTS activities were the best for catalysts that were calcined at high heating rates to temperatures higher than 160° C. (see FIG. 6).

TABLE 13

High heating rate fluidised bed calcination catalyst precursor characteristics at various reactor temperatures (final hold temperature for all was 250° C.)

| Catalyst | Reactor bed T, ° C. | Heating rate for precursor, ° C./min | GHSV, Nm$^3$/mol NO$_3$ (Nm$^3$/kg Co(NO$_3$)$_2$·6H$_2$O) | Co$_3$O$_4$ Crystallite size, nm | Turbidity, NTU* |
|---|---|---|---|---|---|
| Example 15 ex 1st impregnation, #292 | 210 | 67 | 1.84 (14.76) | 10 | 69 |
| Example 15 ex 2nd impregnation, #293 | 210 | 68 | 1.84 (14.76) | 13 | 34 |
| Example 16 ex 1st impregnation, #295 | 180 | 48 | 1.84 (14.76) | 11 | 124 |
| Example 17 ex 1st impregnation, #294 | 250 | 144 | 1.84 (14.76) | 12 | 77 |
| Example 18 ex 1st impregnation | 130 | 30 | 1.2 (9.63) | 48 | 266 |
| Example 19 ex 1st impregnation | 140 | 38 | 1.2 (9.63) | 17 | 210 |
| Example 20 ex 1st impregnation | 150 | 48 | 1.2 (9.63) | 16 | — |
| Example 21 ex 1st impregnation | 160 | 53 | 1.2 (9.63) | 11 | 115 |
| Example 22 ex 1st impregnation | 170 | 66 | 1.2 (9.63) | 10 | — |

*Ultrasonic-turbidity error ±19 NTU

Example 23 (Inventive): Low Heating Rate Fluidisation Calcination of 15 g Co/0.025 g Pt/2.2 g Mn/100 g Ti—SiO$_2$ (C5372, pH=5) Up to 80° C. at 1° C./min Followed by High Heating Rate Calcination of 138° C./min at 250° C.

Dried impregnated free flowing support powder prepared as described in Example 11 was calcined at a low heating rate of 1° C./min up to 80° C. using a GHSV of 2.5 Nm$^3$air/kg (Co(NO$_3$)$_2$·6H$_2$O)/hour and calcined thereafter at a high heating rate at 250° C. using a GHSV as shown in Table 7.

Example 24 (Inventive): Low Heating Rate
Fluidisation Calcination of 15 g Co/0.025 g Pt/2.2
g Mn/100 g Ti—SiO$_2$ (C5377, pH=5) Up to 90° C.
at 1° C./min Followed by a High Heating Rate of
138° C./min Calcination at 250° C.

Dried impregnated free flowing support powder prepared as described in Example 11 was calcined at a low heating rate of 1° C./min up to 90° C. using a GHSV of 2.5 Nm$^3$air/kg (Co(NO$_3$)$_2$·6H$_2$O)/hour and calcined thereafter at a high heating rate at 250° C. using a GHSV as shown in Table 7.

Example 25 (Inventive): Low Heating Rate
Fluidisation Calcination of 15 g Co/0.025 g Pt/2.2
g Mn/100 g Ti—SiO$_2$ (C5378, pH=5) Up to 100°
C. at 1° C./min Followed by a High Heating Rate
of 138° C./min Calcination at 250° C.

Dried impregnated free flowing support powder prepared as described in Example 11 was calcined at a low heating rate of 1° C./min up to 100° C. using a GHSV of 2.5 Nm$^3$air/kg (Co(NO$_3$)$_2$·6H$_2$O)/hour and calcined thereafter at a high heating rate @ 250° C.

Example 26 (Inventive): Fluidised Bed Calcination
of 15 g Co/0.025 g Pt/2.2 g Mn/100 g Ti—SiO$_2$ at
a High Heating Rate of 138° C./min at 250° C.
(C5390, pH=5)

A catalyst precursor was prepared as described in Example 17, but on a smaller scale; that is, 50 g support material was used as opposed to 10 kg support material. All other raw materials used during the catalyst precursor preparation were scaled down accordingly.

Discussion

Some negative effects started to arise by calcining the impregnated catalyst support at low heating rates at temperatures as low as 90° C. (Example 24). This included poorer Co distribution which may be due to Co migration to the periphery of the particle (see Table 14). The catalyst precursor of Example 25 which was calcined at a low heating rate of 1° C./min up to 100° C. in a fluidised bed further formed more ultra-fines during ultrasonic exposure with higher turbidity readings compared to Example 26 (see Table 14).

Quantitative Energy Dispersive Spectroscopy (EDS) was done and the normalized mass % at different regions of the particle was determined to represent and compare the distribution and migration of the cobalt of Example 23-Example 26 in numerical form. The Co/Si mass % ratio was then determined at the particle edge (first 5 microns of the particle) and the middle of the particle.

Since the edge of the particle in Example 24 and Example 25 had a higher Co/Si mass % normalized ratio than the middle of the particle, it shows quantitatively that an uneven distribution is present compared to Example 23 and Example 26. An even cobalt distribution was obtained in Example 23 and Example 26 where the Co/Si mass % normalized ratio are similar at the particle edge and in the middle of the particle (see Table 14).

TABLE 14

Low heating rate fluidisation calcination between 80-100° C.
followed by high heating rate calcination at 250° C.

| Catalyst | Low heating rate bed T, ° C. | High heating rate bed T, ° C. | Co$_3$O$_4$ Crystallite size, nm | Turbidity, NTU | Co/Si normalized mass % ratio (Mean ± 95% confidence interval) | |
|---|---|---|---|---|---|---|
| | | | | | Particle edge (first 5 microns) | Middle of particle |
| Example 23 | 80 | 250 | 12 | 72 | 0.4 ± 0.0 | 0.4 ± 0.1 |
| Example 24 | 90 | 250 | 12 | 79 | 0.6 ± 0.0 | 0.2 ± 0.0 |
| Example 25 | 100 | 250 | 13 | 141 | 0.6 ± 0.1 | 0.1 ± 0.0 |
| Example 26 | — | 250 | 12 | 77 | 0.4 ± 0.0 | 0.3 ± 0.0 |

Example 27: Fluidised Bed Calcination of 30 g Co/0.075 g Pt/2.2 g Mn/100 g Ti—SiO$_2$ at a High Heating Rate of 68° C./min at 210° C. (C2177, pH=5) where Only 16% Co(NO$_3$)$_2$·6H$_2$O Crystal Waters were Removed A catalyst precursor was prepared as described in Example 15; however, the excess water was removed under reduced pressure in a Lödige dryer as opposed to a conical dryer using the drying profile in Table 15 to obtain a free flowing powder. Only 16% Co(NO$_3$)$_2$·6H$_2$O crystal waters were removed with a final LOI$_{400}$ of 25.9%.

The catalyst precursor was activated as described in Example 5 and thereafter tested for its slurry phase FTS performance on a micro slurry CSTR under conditions as described in Example 6.

TABLE 15

Drying profile of the impregnated support in a Lödige dryer

| Pressure [mbar] | Temperature [° C.] | Time [min] |
|---|---|---|
| Atm | 60 | 10 |
| 220 | 60 | 15 |
| 220 | 75 | 30 |
| 220 | 85 | 30 |
| 220-120 | 85 | 120 |
| 120-50 | 100 | 240 |

Discussion

The Co$_3$O$_4$ crystallite size of the catalyst precursor as prepared in Example 27 with a final LOI of 25.9% was larger than the crystallites size obtained in Example 15 with a final LOI of 22.8%. The FT synthesis activity was consequently also lower compared to Example 15 (see Table 16).

TABLE 16

Effect of drying on crystallite size and FT synthesis activity

| | % Co(NO$_3$)$_2$·6H$_2$O | | Co$_3$O$_4$ crystallite size, nm | | % Difference in activity of Example 27 (CB245) |
|---|---|---|---|---|---|
| Catalyst | Crystal water removed | Final LOI$^{400}$, % | ex 1$^{st}$ impregnation | ex 2$^{nd}$ impregnation | relative to Example 15 (CB246) after 10 days |
| Example 27 | 16% | 25.9 | 16 | 18 | −24 |
| Example 15 | 44% | 22.8 | 10 | 13 | 0 |

Example 28 (Comparative): Fixed Bed Calcination of 30 g Co/0.075 g Pt/2.2 g Mn/100 g Ti—SiO$_2$ (C5253)

A catalyst precursor was prepared as described in Example 11; however the impregnated catalyst support was calcined in a fixed bed at a heating rate of 0.5° C./min in a 12% O$_2$+He flow (0.5 ml/s) up to 150° C., 175° C. and 250° C.

The decomposition products of Co(NO$_3$)$_2$·6H$_2$O were measured by means of FTIRS with gas phase analysis.

Example 29 (Comparative): Fixed Bed Calcination of 30 g Co/0.075 gPt/2.5 g MAc/100 g Ti/Mn-Modified-SiO$_2$ (2.6 g Ti/3.1 g Mn/100 g SiO$_2$) (C5252)

A catalyst precursor was prepared as described in Example 3; however the impregnated catalyst support was calcined in a fixed bed at a heating rate of 0.5° C./min in a 12% 0$_2$+He flow (0.5 ml/s) up to 130° C., 175° C. and 250° C.

The decomposition products of Co(NO$_3$)$_2$·6H$_2$O were measured by means of FTIRS with gas phase analysis.

Discussion

Figure 7:
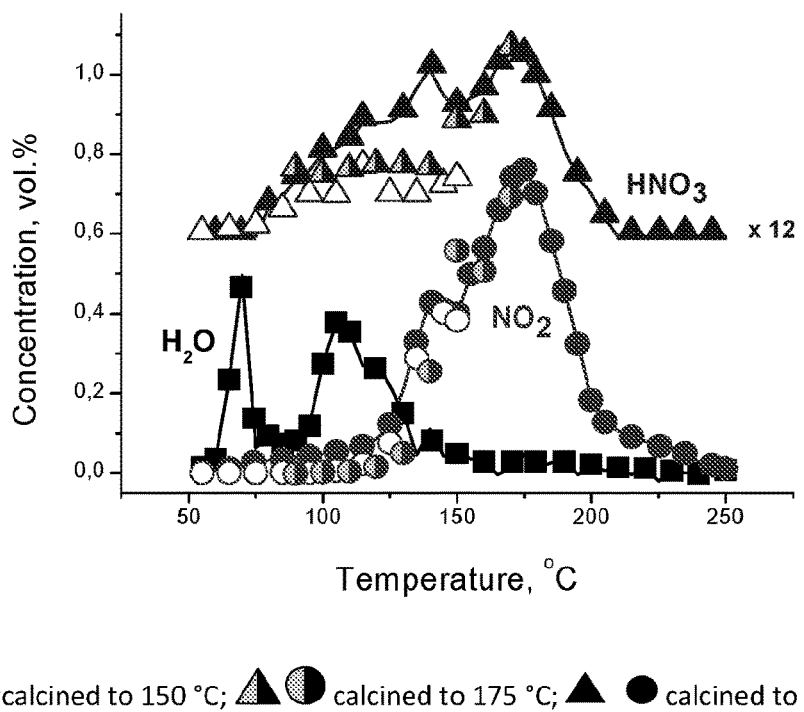
FIG. 7 shows a TPO profile in respect of Example 28.
Figure 8:
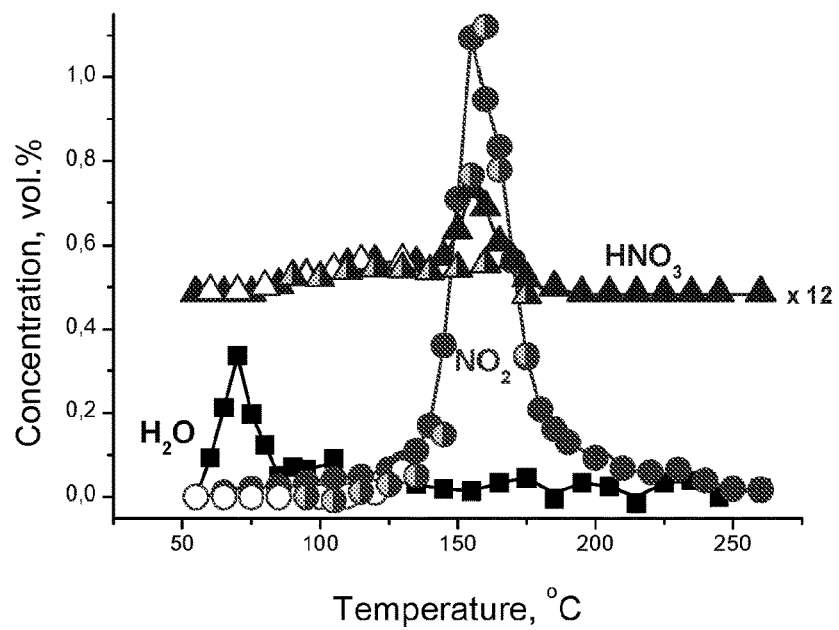
FIG. 8 shows a TPO profile in respect of Example 29.

The TPO profiles of H$_2$O, NO$_2$ and HNO$_{3\,(g)}$ during linear heating at 0.5° C./min of Example 28 and Example 29 are shown in FIG. 7 and FIG. 8. From FIG. 7, it is seen that water is released at 70° C. and 105° C. while both the NO$_2$ and HNO$_{3(g)}$ are released at 140° C. and 175° C. The evolution point of the NO$_2$ at quantities of NO$_2$ of 1500 ppm(v) (0.15-vol-%) is at 115° C. (see FIG. 7). In contrast to Example 28, the addition of an organic modifier in Example 29 resulted in a shift in the said evolution point of the NO$_2$ at 125° C. with the NO$_2$ peak at 155° C.

Example 30: Fluidised Bed Calcination of 30 g Co/0.075 g Pt/2.2 g Mn/100 g Ti—SiO$_2$ at a High Heating Rate of 233° C./min at 350° C. (C5389)

A catalyst precursor was prepared as described in Example 11; however, the calcination reactor temperature applied to the bed after the 1$^{st}$ and 2$^{nd}$ impregnation steps was 350° C.

The catalyst precursor was activated as described in Example 5 and the resulting catalyst thereafter tested for its slurry phase FTS performance on a micro slurry CSTR under conditions as described in Example 6.

Discussion

The catalyst that was calcined at a high heating rate at 350° C. resulted in a poorer FTS performance (see FIG. 4). The relative phase abundance % of the inactive Co$_2$SiO$_4$ was also higher (see Table 17).

TABLE 17

Catalyst precursor characteristics calcined at a high heating rate at 350° C.

| Catalyst | Reactor bed T, ° C. | Final hold T, ° C. | Heating rate for precursor, ° C./min | Co$_3$O$_4$ Crystallite size, nm | Relative phase abundance, % | |
|---|---|---|---|---|---|---|
| | | | | | Co$_3$O$_4$ | Co$_2$SiO$_4$ |
| Ex. 11 | 210 | 250 | 67 | 15 | 70 | 22 |
| Ex. 30 | 350 | 250 | 233 | 8 | 73 | 27 |

The invention claimed is:

1. A process for preparing a cobalt-containing catalyst precursor, which process includes
calcining a loaded catalyst support comprising a silica (SiO$_2$) catalyst support supporting cobalt nitrate, the calcination of the loaded catalyst support comprising converting the cobalt nitrate into cobalt oxide; and the calcination including heating the loaded catalyst support at a high heating rate which does not fall below 10° C./minute during at least a temperature range A which is from the lowest temperature at which the calcination of the loaded catalyst support begins to 165° C. and wherein gas flow is effected over the loaded catalyst support during at least the temperature range A at a gas hourly space velocity (GHSV) of at least 5 Nm³/kg cobalt nitrate/hour, the lowest temperature at which calcination of the loaded catalyst support begins being the temperature at which cobalt nitrate begins to decompose to release $NO_2$ gas in excess of 1500 ppm(v) as measured by means of FTIRS with gas phase analysis at a heating rate of 0.5° C./min in a He gas mixture containing 12% $O_2$ gas flow rate of (0.5 ml/s), thereby to produce the cobalt-containing catalyst precursor.

2. The process of claim 1 wherein the silica ($SiO_2$) catalyst support is porous and has an average pore diameter of more than 20 nm but less than 50 nm, the average pore diameter being determined by means of Barrett-Joyner-Halenda (BJH) nitrogen physisorption analysis.

3. The process of claim 1 wherein the loaded catalyst support includes both a titanium compound on and/or in the catalyst support and a manganese compound on and/or in the catalyst support.

4. The process of claim 1 wherein the loaded catalyst support includes cobalt hydroxide ($Co(OH)_2$) in addition to the cobalt nitrate.

5. The process of claim 1 wherein the loaded catalyst support includes a dopant capable of enhancing the reducibility of a cobalt nitrate after calcination thereof, the dopant being in the form of a dopant compound which is a compound of a metal selected from the group including palladium (Pd), platinum (Pt), ruthenium (Ru), rhenium (Re) and a mixture of two or more thereof.

6. The process of claim 1 wherein the calcination includes heating the loaded catalyst support to a temperature above the temperature range A.

7. The process of claim 1 wherein the calcination includes heating the loaded catalyst support at a high heating rate which does not fall below 10° C./minute during at least a temperature range which is from 100° C. to 170° C.

8. The process of claim 7 wherein the calcination includes heating the loaded catalyst support at a high heating rate which does not fall below 10° C./minute during at least a temperature range which is from 100° C. to 220° C.

9. The process of claim 1 wherein the gas flow that is effected over the loaded catalyst support during the temperature range A is at a gas hourly space velocity (GHSV) of at least 9 Nm³/kg cobalt nitrate/hour.

10. The process of claim 1 wherein the calcination is carried out in a fluidised bed calciner.

11. The process of claim 1 which includes drying the loaded catalyst support prior to calcining the loaded catalyst support at the high heating rate during the temperature range A.

12. A process for preparing a cobalt-containing catalyst, the process comprising preparing a cobalt-containing catalyst precursor as claimed in claim 1; and reducing the catalyst precursor, thereby activating the catalyst precursor and obtaining the catalyst.

13. A hydrocarbon synthesis process for producing hydrocarbons or oxygenates of hydrocarbons, which process includes preparing a cobalt-containing catalyst according to the process as claimed in claim 12; and the process also including contacting the said catalyst with hydrogen and carbon monoxide at a temperature above 100° C. and at a pressure of at least 10 bar to produce hydrocarbons or oxygenates of hydrocarbons.

14. The hydrocarbon synthesis process of claim 13 which includes a hydroprocessing step for converting the hydrocarbons or oxygenates thereof to liquid fuels and/or other chemicals.

* * * * *